US010648831B2

(12) United States Patent
Beaurepaire et al.

(10) Patent No.: US 10,648,831 B2
(45) Date of Patent: May 12, 2020

(54) METHOD, APPARATUS, AND COMPUTER PROGRAM PRODUCT FOR PROVIDING AN INDICATION OF FAVORABILITY OF PARKING LOCATIONS

(71) Applicant: HERE Global B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 125 days.

(21) Appl. No.: 15/693,086

(22) Filed: Aug. 31, 2017

(65) Prior Publication Data
US 2019/0063947 A1 Feb. 28, 2019

(51) Int. Cl.
*G01C 21/36* (2006.01)
*G08G 1/14* (2006.01)
*G01C 21/34* (2006.01)

(52) U.S. Cl.
CPC ..... *G01C 21/3697* (2013.01); *G01C 21/3423* (2013.01); *G01C 21/3453* (2013.01);
(Continued)

(58) Field of Classification Search
CPC ...... G08G 1/14; G08G 21/36; G01C 21/3697; G01C 21/3423; G01C 21/3453; G01C 21/3476
See application file for complete search history.

(56) References Cited

U.S. PATENT DOCUMENTS 6,119,065 A * 9/2000 Shimada ................ G01C 21/20
340/944
6,208,934 B1 * 3/2001 Bechtolsheim .... G01C 21/3423
340/988
(Continued)

FOREIGN PATENT DOCUMENTS

WO WO 2014/108387 A2 7/2014

OTHER PUBLICATIONS

International Search Report and Written Opinion for Application No. PCT/EP2018/073275 dated Jan. 3, 2019, 13 pages.
(Continued)

*Primary Examiner* — Hunter B Lonsberry
*Assistant Examiner* — Luis A Martinez Borrero
(74) *Attorney, Agent, or Firm* — Alston & Bird LLP

(57) ABSTRACT

A method, apparatus, and computer program product are provided for providing an indication of parking space favorability proximate a vehicle and a routing algorithm to reach the most desirable parking spaces of a parking facility. A method may include: providing route guidance for a vehicle within a parking facility; determining a favorability of a parking space proximate the vehicle in response to receiving an indication of vehicle location within the parking facility; and providing an indication of the favorability of a parking space proximate the vehicle where the indication of favorability includes an indication of a distance from the vehicle to a pedestrian access point of the parking facility and an indication of a distance from the pedestrian access point to the final destination. The routing algorithm may compute a route through the most suitable clusters of available parking spaces based on favorable criteria such as distance, availability, and desirability.

23 Claims, 16 Drawing Sheets

(52) U.S. Cl.
CPC ..... *G01C 21/3476* (2013.01); *G01C 21/3685* (2013.01); *G08G 1/143* (2013.01); *G08G 1/14* (2013.01)

(56) References Cited

U.S. PATENT DOCUMENTS

| | | | |
|---|---|---|---|
| 6,374,182 B2* | 4/2002 | Bechtolsheim .... | G01C 21/3423 340/988 |
| 6,501,391 B1* | 12/2002 | Racunas, Jr. ...... | G06Q 30/0284 235/378 |
| 6,542,811 B2* | 4/2003 | Doi ........................ | G01C 21/20 701/429 |
| 6,946,974 B1* | 9/2005 | Racunas, Jr. ......... | G06Q 10/02 235/378 |
| 6,970,101 B1* | 11/2005 | Squire ..................... | G08G 1/14 340/309.16 |
| 7,333,820 B2* | 2/2008 | Sheha .................... | G01C 21/26 379/201.06 |
| 7,395,149 B2 | 7/2008 | Matsumoto et al. | |
| 7,516,010 B1* | 4/2009 | Kaplan .................. | G01C 21/30 701/426 |
| 7,538,690 B1* | 5/2009 | Kaplan .................. | G01C 21/20 340/932.2 |
| 7,860,647 B2* | 12/2010 | Amano .............. | G01C 21/3476 340/905 |
| 7,925,435 B2* | 4/2011 | Brulle-Drews .... | G01C 21/3423 340/995.1 |
| 8,473,198 B2* | 6/2013 | Krumm ................. | G01C 21/26 701/410 |
| 8,498,808 B2* | 7/2013 | Vavrus ................. | G01C 21/20 701/408 |
| 8,700,314 B2* | 4/2014 | Vavrus ................... | G01C 21/20 701/410 |
| 8,718,925 B2* | 5/2014 | Letchner ............ | G01C 21/3484 701/410 |
| 8,738,291 B2* | 5/2014 | Ford ....................... | G01C 21/26 701/408 |
| 9,024,970 B2* | 5/2015 | Lynch ................ | G01C 21/3635 345/629 |
| 9,204,257 B1* | 12/2015 | Mendelson .............. | G08G 1/14 |
| 9,971,470 B2* | 5/2018 | Cooper .............. | G01C 21/3667 |
| 10,176,718 B1* | 1/2019 | Mazuir .................. | H04W 4/023 |
| 10,240,943 B2* | 3/2019 | Baracco ................ | G01C 21/367 |
| 10,352,718 B2* | 7/2019 | Wu ....................... | G09B 29/106 |
| 10,424,202 B1* | 9/2019 | Beaurepaire ........... | G08G 1/147 |
| 2001/0025222 A1* | 9/2001 | Bechtolsheim .... | G01C 21/3423 701/410 |
| 2005/0033634 A1 | 2/2005 | Pugliese, III | |
| 2005/0096974 A1* | 5/2005 | Chagoly ................... | G08G 1/14 705/13 |
| 2006/0247849 A1* | 11/2006 | Mohsini ................ | G01C 21/20 701/434 |
| 2008/0033640 A1* | 2/2008 | Amano .............. | G01C 21/3476 701/414 |
| 2009/0187337 A1 | 7/2009 | Denk, Jr. | |
| 2012/0056758 A1 | 3/2012 | Kuhlman et al. | |
| 2012/0078504 A1* | 3/2012 | Zhou .................. | G01C 21/3611 701/411 |
| 2012/0253929 A1* | 10/2012 | Alberth ................ | G01C 21/343 705/14.53 |
| 2013/0030702 A1 | 1/2013 | Yamamoto | |
| 2013/0297198 A1* | 11/2013 | Vande Velde .......... | G01C 21/28 701/409 |
| 2015/0354979 A1 | 12/2015 | Cengil | |
| 2015/0369618 A1* | 12/2015 | Barnard .................. | H04W 4/70 701/491 |
| 2016/0025503 A1 | 1/2016 | Kees et al. | |
| 2016/0047672 A1 | 2/2016 | Sachdev et al. | |
| 2016/0069695 A1* | 3/2016 | Broadbent ......... | G01C 21/3691 701/411 |
| 2016/0178376 A1* | 6/2016 | Moore ............... | G01C 21/3685 701/532 |
| 2017/0363437 A1* | 12/2017 | Baracco ............ | G01C 21/367 |
| 2018/0053417 A1* | 2/2018 | Rolf ....................... | G08G 1/143 |
| 2018/0283889 A1* | 10/2018 | Koo ................. | G01C 21/3484 |
| 2019/0197897 A1* | 6/2019 | Song ..................... | G08G 1/143 |
| 2019/0210594 A1* | 7/2019 | Glebov ................. | B60W 30/06 |

OTHER PUBLICATIONS

Rajabioun, T. et al., *Intelligent Parking Assist*, 2013 21st Mediterranean Conference on Control and Automation (dated Jun. 25-28, 2013) 1156-1161.

* cited by examiner

| Cluster Point | Distance to Access Point (1 to 10) | Availability # (1 to 6) | Space Factor (0 to 2) | Rating |
|---|---|---|---|---|
| A | 2 | 1 | 1 | 3 |
| B | 2 | 3 | 2 | 10 |
| C | 4 | 4 | 2 | 16 |
| D | 4 | 1 | 1 | 5 |
| E | 10 | 0 | 0 | 0 |
| F | 8 | 1 | 1 | 9 |
| G | 6 | 3 | 1.5 | 13.5 |
| H | 4 | 4 | 1.5 | 12 |
| I | 10 | 0 | 0 | 0 |
| J | 8 | 2 | 1.5 | 15 |
| K | 6 | 5 | 2 | 22 |
| L | 4 | 5 | 2 | 18 |

METHOD, APPARATUS, AND COMPUTER PROGRAM PRODUCT FOR PROVIDING AN INDICATION OF FAVORABILITY OF PARKING LOCATIONS

TECHNOLOGICAL FIELD

An example embodiment of the present invention relates to estimating the favorability of parking spaces proximate a destination, and more particularly, to generating an indication of the favorability of a parking location through presentation of a representation of a route to a final destination based on a parking location, and providing a route through a parking facility to a cluster of parking spaces that is highly rated according to certain criteria.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making. Data received from infrastructure monitoring systems and crowd-sourced data has become ubiquitous and may be available for facilitating route guidance and navigation system information.

Location-based services may include providing an indication of parking availability to a user while they are searching for a parking space. Generally, parking in a parking lot or parking structure (e.g., a parking garage) is not the final destination for a user. The parking location is typically a location close to where the user's final destination is located, though parking proximity and ease of access to a final destination can vary widely in a parking lot or parking structure, particularly in large parking structures with multiple floors and pedestrian routes to exit the parking structure.

BRIEF SUMMARY

A method, apparatus, and computer program product are provided in accordance with an example embodiment described herein for providing an indication of the favorability of parking spaces proximate a vehicle within a parking facility. A navigation system including a display to provide route guidance may be provided including at least one non-transitory memory including computer program code instructions. The computer program code instructions, when executed, may cause the navigation system to at least: receive an indication of a final destination; determine a route to a parking facility proximate the final destination; provide route guidance for a vehicle toward the parking facility; determine a favorability of a parking space proximate the vehicle in response to receiving an indication of vehicle location within the parking facility; and provide an indication on the display of the favorability of a parking space proximate the vehicle, wherein the indication of the favorability includes an indication of a distance from the vehicle to a pedestrian access point to the parking facility and an indication of a distance from the pedestrian access point to the parking facility to the final destination. The indication of the favorability of a parking space proximate the vehicle may include an indication of a direction of travel within the parking facility for parking spaces with improved favorability of parking space location.

The navigation system of example embodiments may optionally be caused to: determine a furthest distance from a parking space of the parking facility from a pedestrian access point of the parking facility; and determine a shortest distance from a parking space of the parking facility closest to a pedestrian access point of the parking facility, where the indication of the favorability of a parking space is determined based, at least in part, on a distance of the vehicle from a pedestrian access point of the parking facility relative to the furthest distance and the shortest distance. Embodiments of the navigation system may optionally be caused to: determine a parking space having a largest combined distance from a pedestrian access point of the parking facility and a distance from the same pedestrian access point to the final destination; and determine a parking space having a shortest combined distance from a pedestrian access point of the parking facility and a distance from the same pedestrian access point to the final destination, where the indication of the favorability of a parking space is determined based, at least in part, on a combined distance of the vehicle from a pedestrian access point of the parking facility and a distance from that same pedestrian access point to the final destination relative to the largest distance and the smallest distance.

According to some embodiments, the indication of the favorability of a parking space proximate the vehicle may include an indication of a type of pedestrian access at the pedestrian access point, where the type of pedestrian access includes at least one of: one or more stairs, an elevator, an escalator, a moving walkway, an accessible ramp, or an access controlled portal. The indication of the favorability of a parking space proximate the vehicle may include an indication of the favorability based, at least in part, on the type of pedestrian access at the pedestrian access point according to user defined preferences for types of pedestrian access. The navigation system of example embodiments may be caused to determine a favorability of a parking space proximate the vehicle in the parking facility in response to receiving an indication that a location of the vehicle within the parking facility has changed. A favorability of a parking space proximate the vehicle may be determined in response to receiving an indication that a location of the vehicle within the parking facility has changed.

According to some embodiments, causing the navigation system to determine a favorability of a parking space proximate the vehicle in the parking facility may include causing the system to: determine a first total pedestrian path including a distance to a first, closest pedestrian access point of the parking facility and a distance from the first pedestrian access point to the final destination; determine a second total pedestrian path including a distance to a second, different pedestrian access point to the parking facility and a distance from the second pedestrian access point to the final destination; and indicate a favorability of a parking space proximate the vehicle based on the shorter of the first total pedestrian path and a second total pedestrian path.

The final destination may include an entrance to a venue, where the venue includes a plurality of entrances. Causing the navigation system to determine a favorability of a parking space proximate the vehicle may include causing the navigation system to: determine one or more pedestrian paths from the vehicle location to one or more pedestrian access points of the parking facility; determine one or more pedestrian paths from each one of the one or more pedestrian access points to one or more of the plurality of entrances of the venue; and select one of the one or more pedestrian paths from the vehicle location to one of the one or more pedestrian access points and one of the one or more pedestrian paths from the one of the one or more pedestrian access points to one of the plurality of entrances to the venue according to the combination of pedestrian paths from the vehicle location to one of the plurality of entrances to the venue that provides the shortest distance, where providing an indication of a distance from a pedestrian access point to the parking facility and an indication of a distance from the pedestrian access point to the final destination includes the selected one of the pedestrian paths from the vehicle location to the pedestrian access point and the pedestrian access point to the one of the plurality of entrances to the venue.

According to some embodiments, the navigation system may be caused to provide route guidance within the parking facility to a cluster of parking spaces determined to have parking availability. Determining parking availability may include causing the system to: determine occupancy status of parking spaces within the parking facility; and determine a value of available parking spaces within each of the plurality of clusters of parking spaces within the facility, where causing the system to provide route guidance within the parking facility to a cluster of parking spaces includes causing the system to provide route guidance within the parking facility to a cluster of spaces having the highest determined value. Causing the system to provide route guidance within the parking facility to the cluster of spaces having the highest determined value may include causing the system to evaluate other clusters of spaces having parking availability, and generate a route that passes through at least one other cluster of spaces having parking availability, where the generated route is not the most direct route.

A computer program product may be provided including at least one non-transitory computer-readable storage medium having computer-executable program code instructions stored therein. The computer-executable program code instructions may include program code instructions to: receive an indication of a final destination; determine a parking facility proximate the final destination; provide route guidance for a vehicle toward the parking facility; determine a favorability of a parking space proximate the vehicle in response to receiving an indication of a location of the vehicle within the parking facility; and provide an indication of the favorability of a parking space proximate the vehicle, where the indication may include an indication of a distance of the vehicle from a pedestrian access point to the parking facility and an indication of a distance from the pedestrian access point to the final destination. The indication of the favorability of a parking space proximate the vehicle may optionally include an indication of a direction of travel within the parking facility for parking spaces with improved favorability of parking space location.

According to some embodiments, the computer program product may include program code instructions to: determine a furthest distance from a parking space of the parking facility to a pedestrian access point of the parking facility; and determine a shortest distance from a parking space of the parking facility to a pedestrian access point of the parking facility. The indication of favorability of a parking space may be determined based, at least in part, on a distance of the vehicle from a pedestrian access point of the parking facility relative to the furthest distance and the shortest distance.

The computer program product of some embodiments may include program code instructions to: determine a parking space having a largest combined distance from a pedestrian access point of the parking facility and a distance from the same pedestrian access point to the final destination; and determine a parking space having a shortest combined distance from a pedestrian access point of the parking facility and a distance from the same pedestrian access point to the final destination. The indication of the favorability of a parking space may be determined based, at least in part, on a combined distance of the vehicle from a pedestrian access point of the parking facility and a distance from that pedestrian access point to the final destination relative to the largest distance and the shortest distance.

The indication of the favorability of a parking space proximate the vehicle may include an indication of a type of pedestrian access at the pedestrian access point, where the type of pedestrian access includes at least one of: one or more stairs, an elevator, an escalator, a moving walkway, or an access controlled portal. The indication of the favorability of a parking space proximate the vehicle may include an indication of the favorability based, at least in part, on the type of pedestrian access at the pedestrian access point according to user defined preferences for types of pedestrian access.

According to some embodiments, the computer program product may include program code instructions to: determine a favorability of a parking space proximate the vehicle in the parking facility in response to receiving an indication that a location of the vehicle within the parking facility has changed. The program code instructions to determine a favorability of a parking space proximate the vehicle in the parking facility may include program code instructions to: determine a first total pedestrian path including a distance to a first, closest pedestrian access point to the parking facility and a distance from the first pedestrian access point to the final destination; determine a second total pedestrian path including a distance to a second, different pedestrian access point to the parking facility and a distance from the second pedestrian access point to the final destination; and indicate favorability of a parking space proximate the vehicle based on a shorter of the first total pedestrian path and the second total pedestrian path.

According to some embodiments, the final destination may include an entrance to a venue, where the venue includes a plurality of entrances. The program code instructions to determine a favorability of a parking space proximate the vehicle may include program code instructions to: determine one or more pedestrian paths from the vehicle location to one or more pedestrian access points of the parking facility; determine one or more pedestrian paths from each of the one or more pedestrian access points to one or more of the plurality of entrances to the venue; and select one of the one or more pedestrian paths from the vehicle location to one of the one or more pedestrian access points and one of the one or more pedestrian paths from the one of the one or more pedestrian access points to one of the plurality of entrances to the venue according to the combination of pedestrian paths from the vehicle location to one of the plurality of entrances to the venue that provides the shortest distance. Providing an indication of a distance from a pedestrian access point of the parking facility and an indication of a distance from the pedestrian access point to the final destination includes the selected ones of the pedestrian path from the vehicle location to the to the pedestrian access point and the pedestrian access point to the one of the plurality of entrances to the venue.

The computer program product of some example embodiments may include program code instructions to provide route guidance within the parking facility to a cluster of parking spaces determined to have parking availability. The program code instructions to determine parking availability may include program code instructions to: determine occupancy status of parking spaces within the parking facility; and determine a value of available parking spaces within each of a plurality of clusters of parking spaces within the parking facility, where the program code instructions to provide route guidance within the parking facility to a cluster of parking spaces includes program code instructions to provide route guidance within the parking facility to a cluster of parking spaces having the highest determined value. The program code instructions to provide route guidance within the parking facility to the cluster of parking spaces having the highest determined value may include program code instructions to evaluate other clusters of spaces having parking availability, and generate a route that passes through at least one other cluster of spaces having parking availability, where the generated route is not the most direct route.

Embodiments disclosed herein may provide a method including: providing route guidance for a vehicle within a parking facility; determining a favorability of a parking space proximate the vehicle in response to receiving an indication of vehicle location within the parking facility; and providing an indication of the favorability of a parking space proximate the vehicle where the indication of favorability includes an indication of a distance from the vehicle to a pedestrian access point of the parking facility and an indication of a distance from the pedestrian access point to the final destination. The indication of favorability of a parking space proximate the vehicle may include an indication of a direction of travel within the parking facility for parking spaces with improved favorability of parking space location.

BRIEF DESCRIPTION OF THE DRAWINGS

Figure 1:
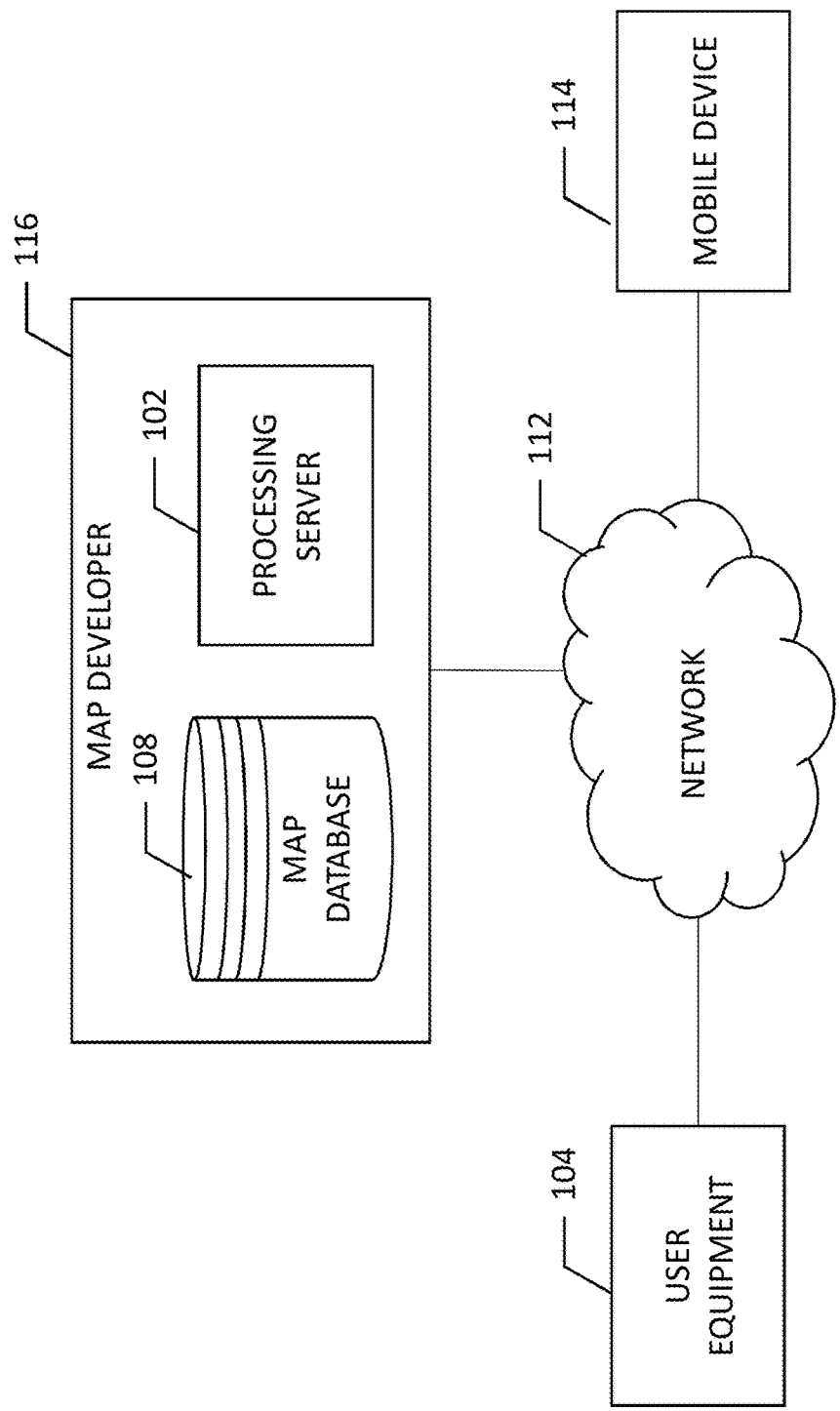
Figure 2:
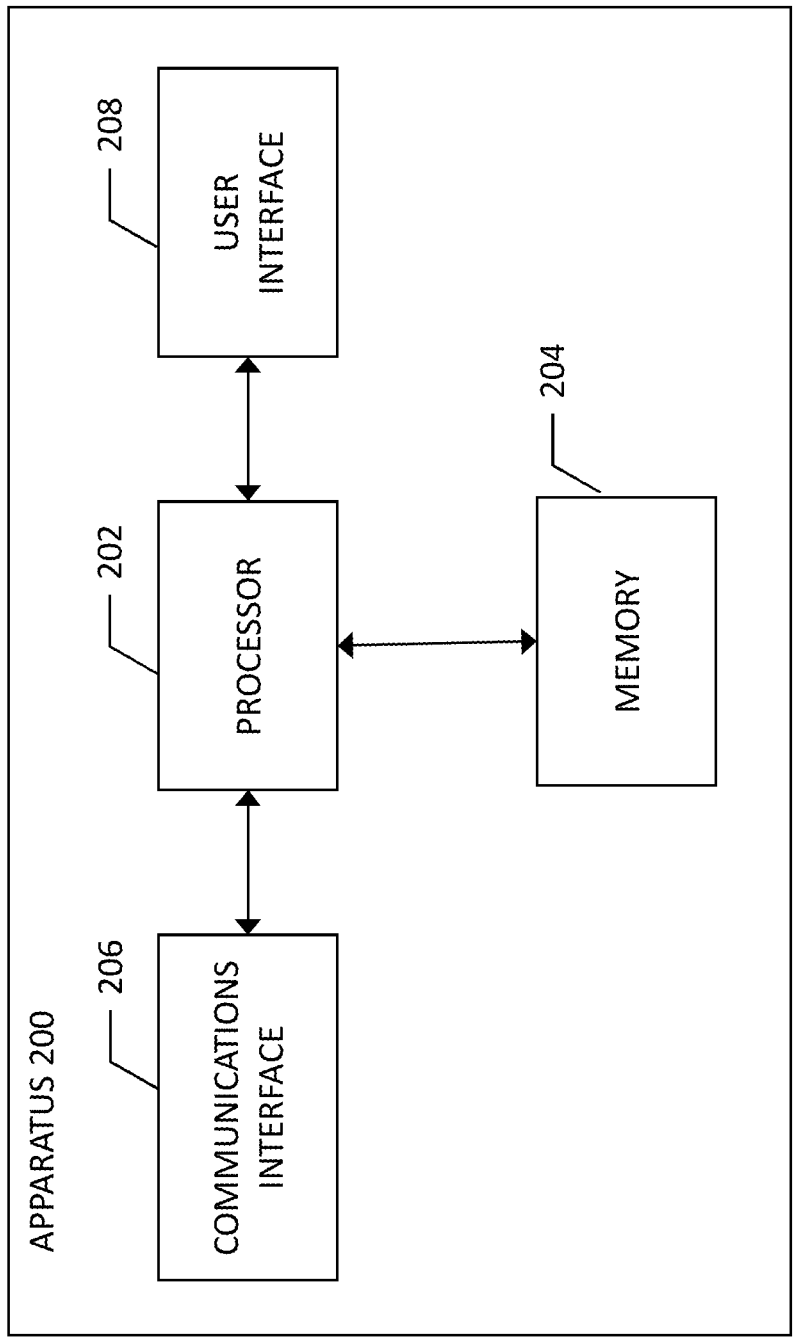
Figure 3:
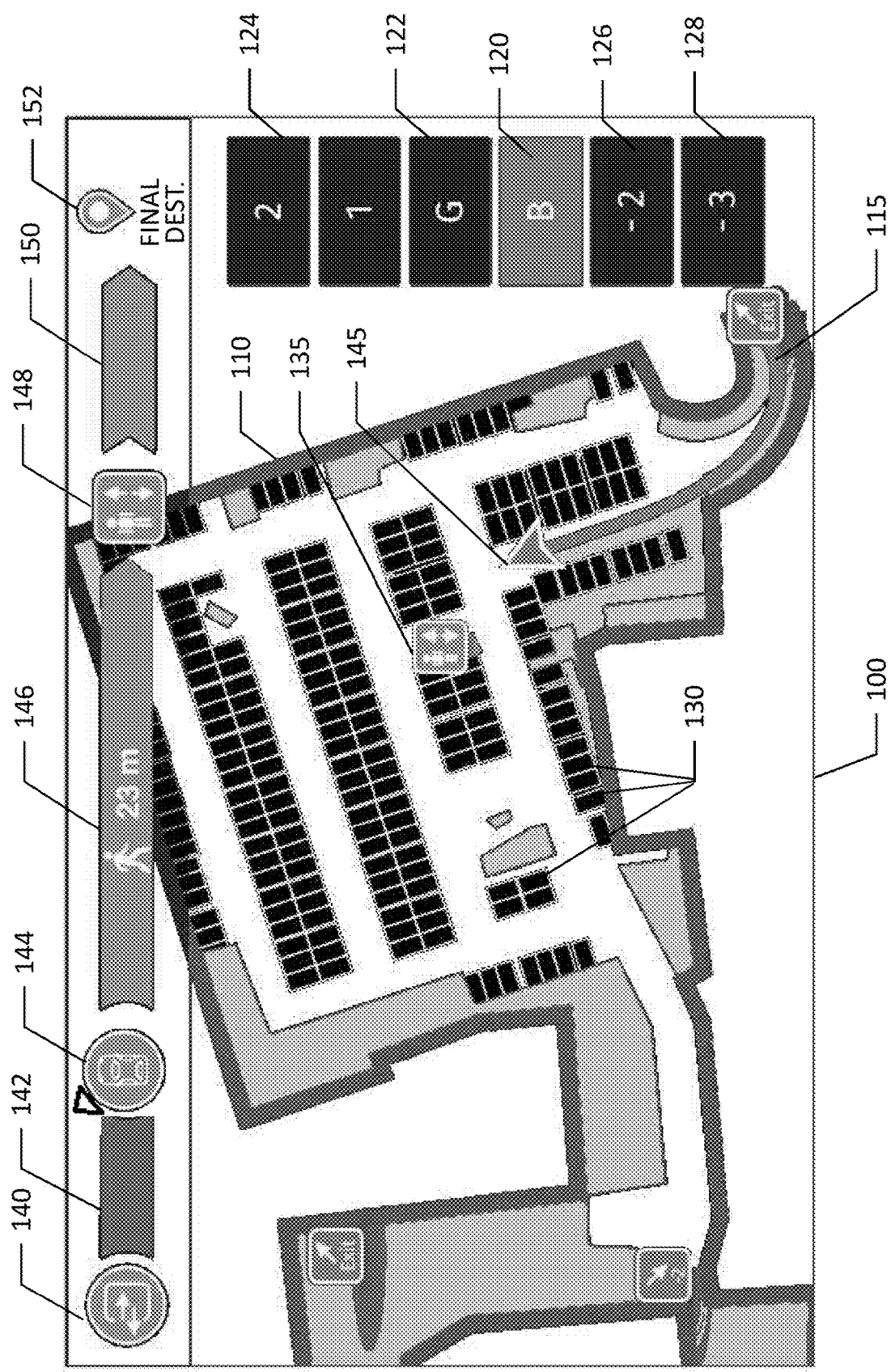
Figure 4:
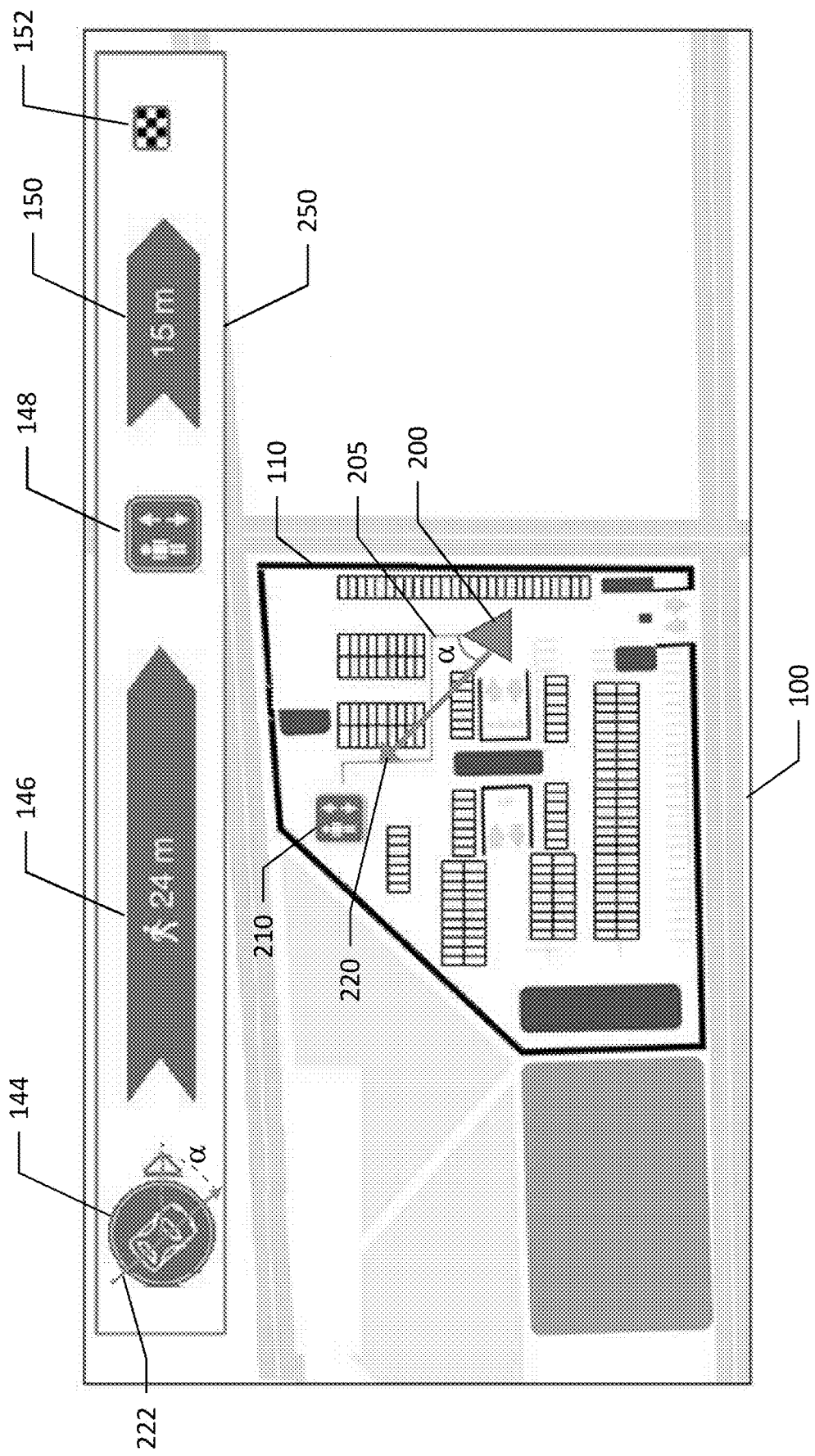
Figure 5:
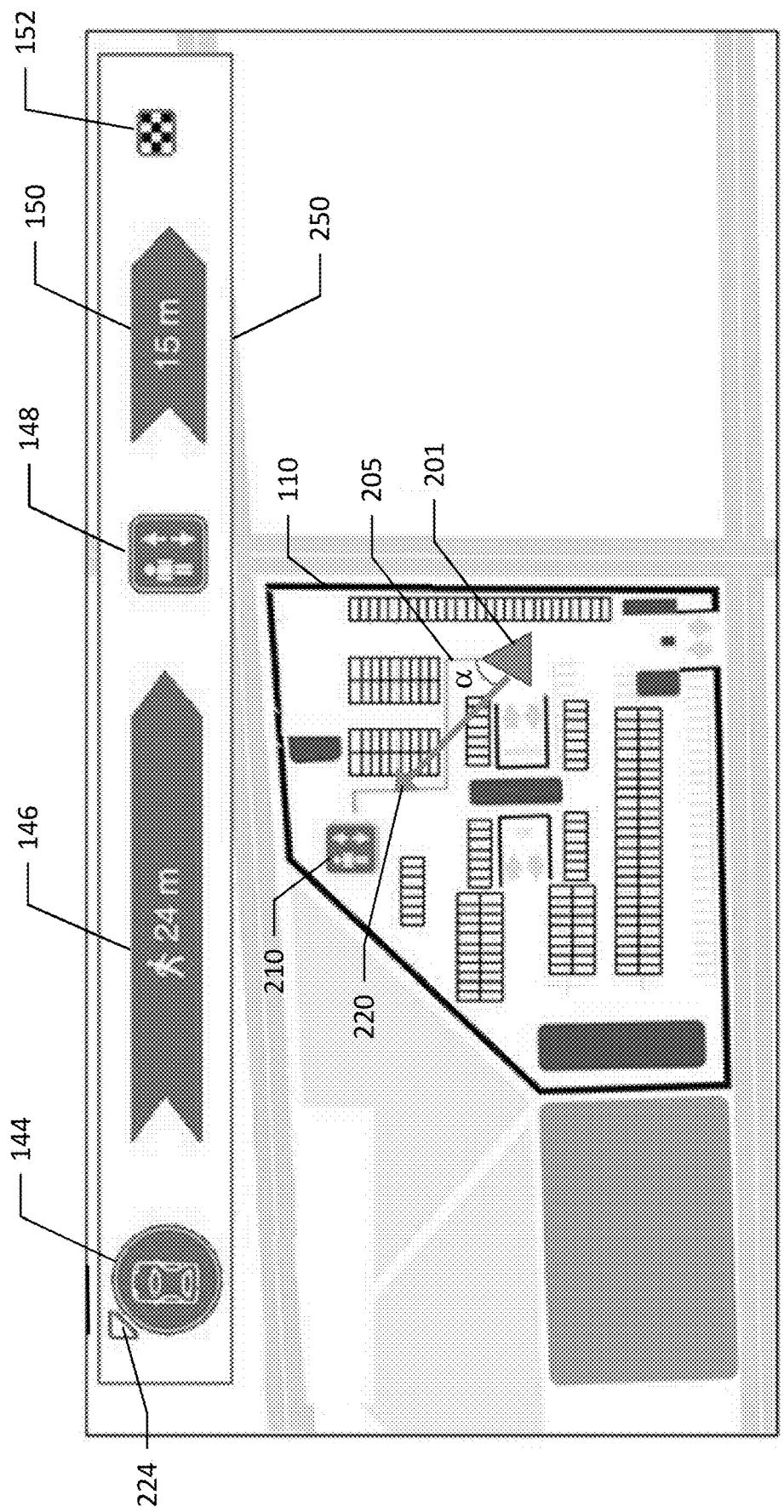
Figure 6:
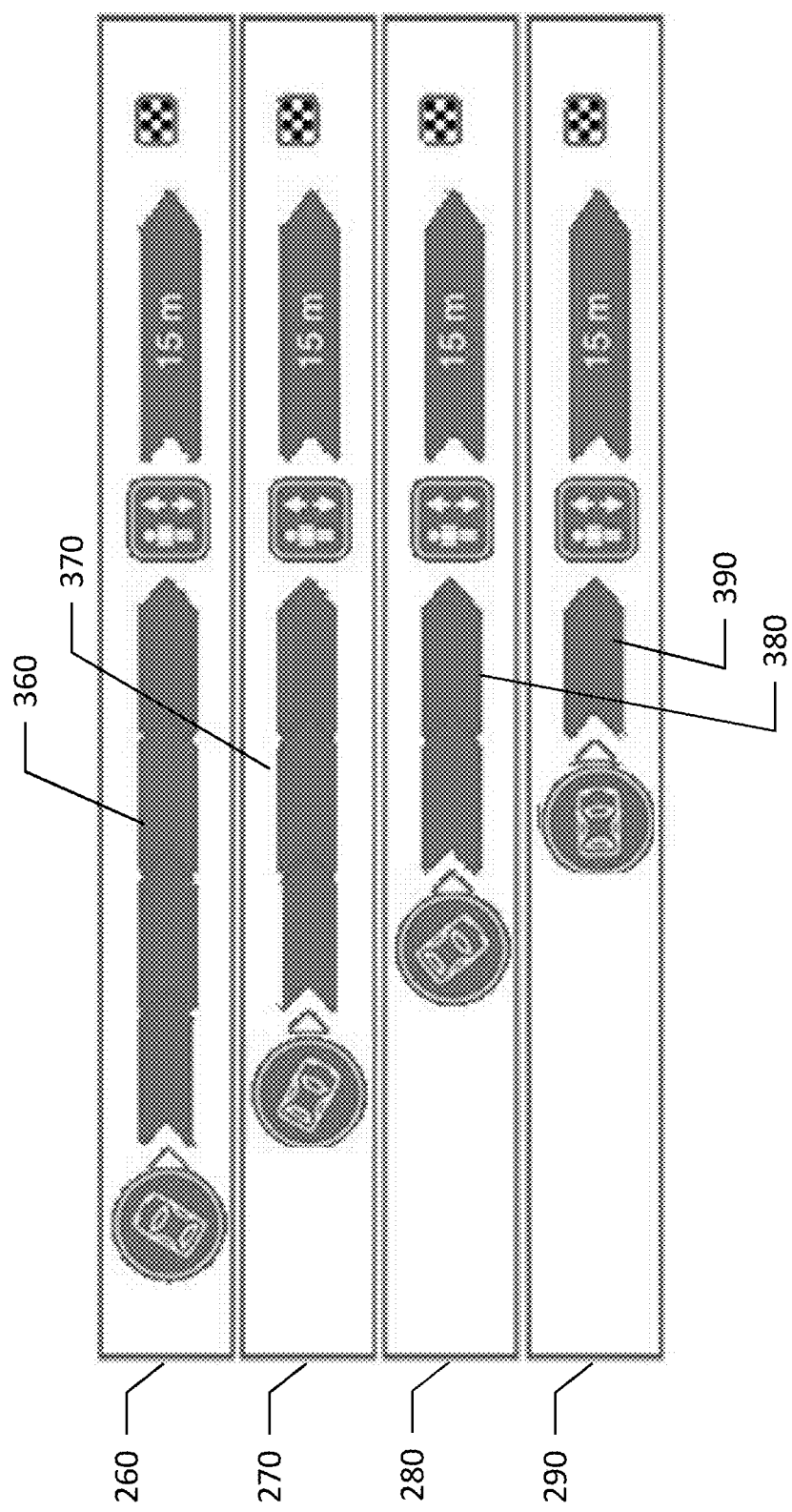
Figure 7:
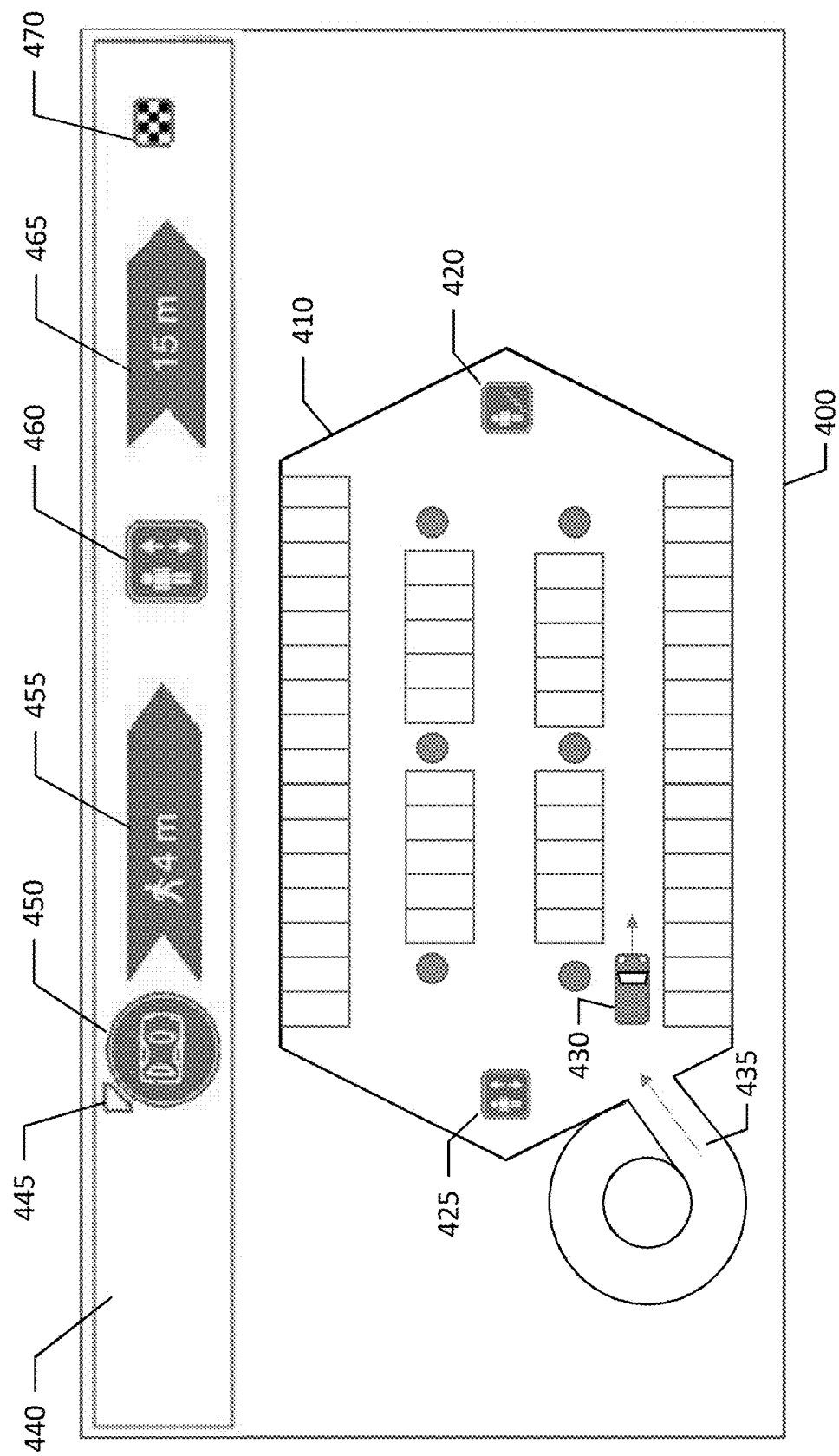
Figure 8:
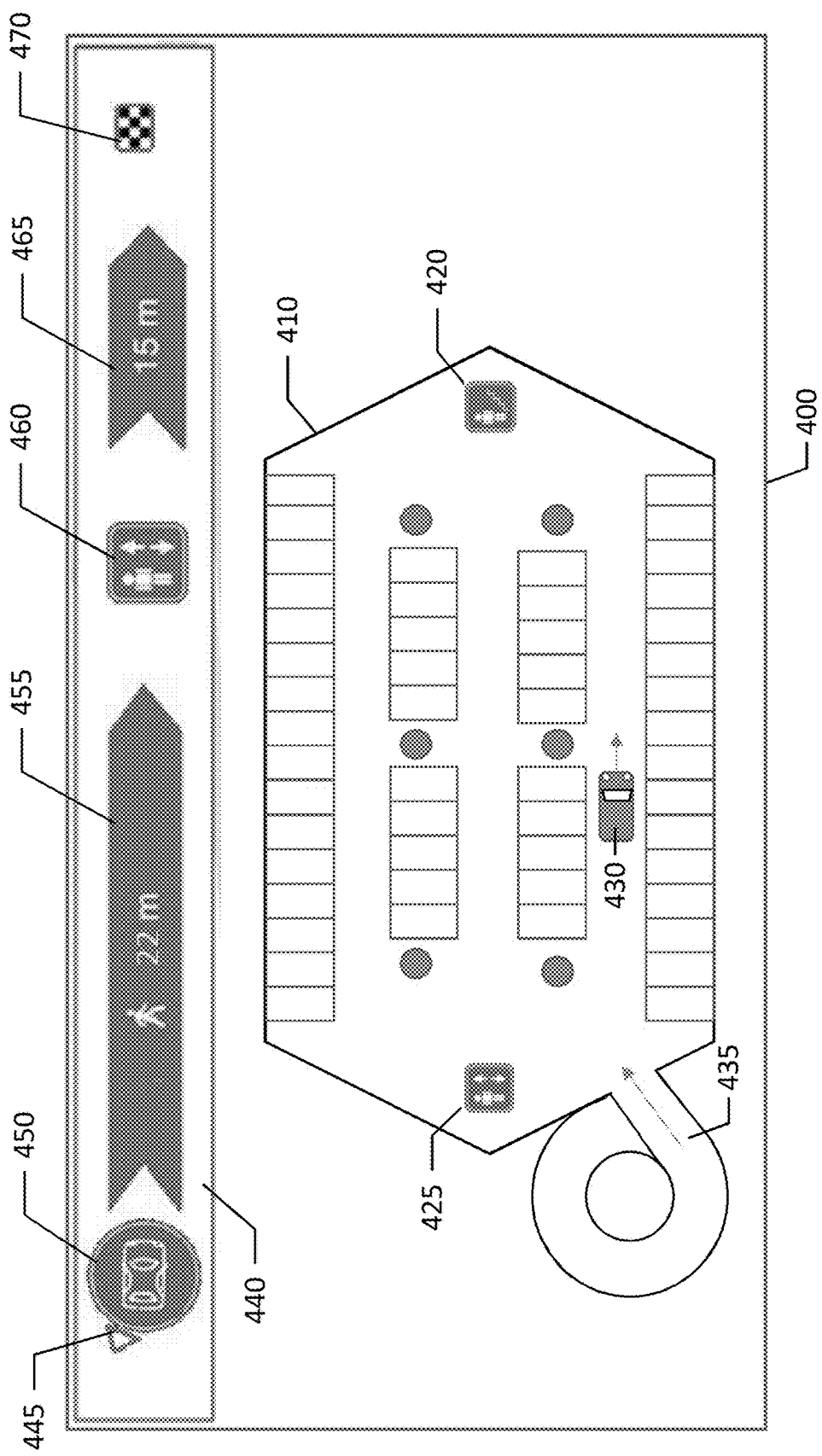
Figure 9:
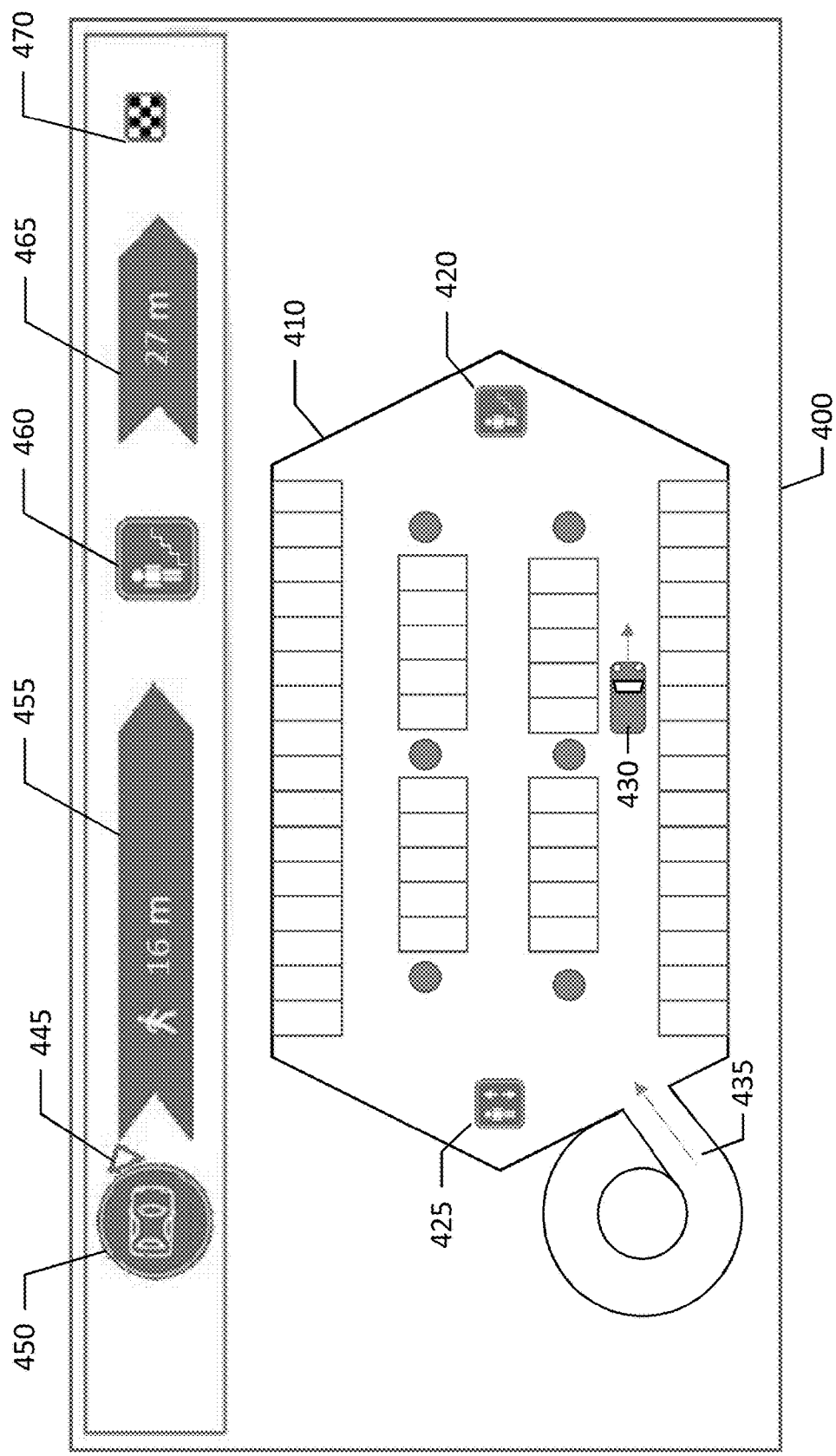
Figure 10:
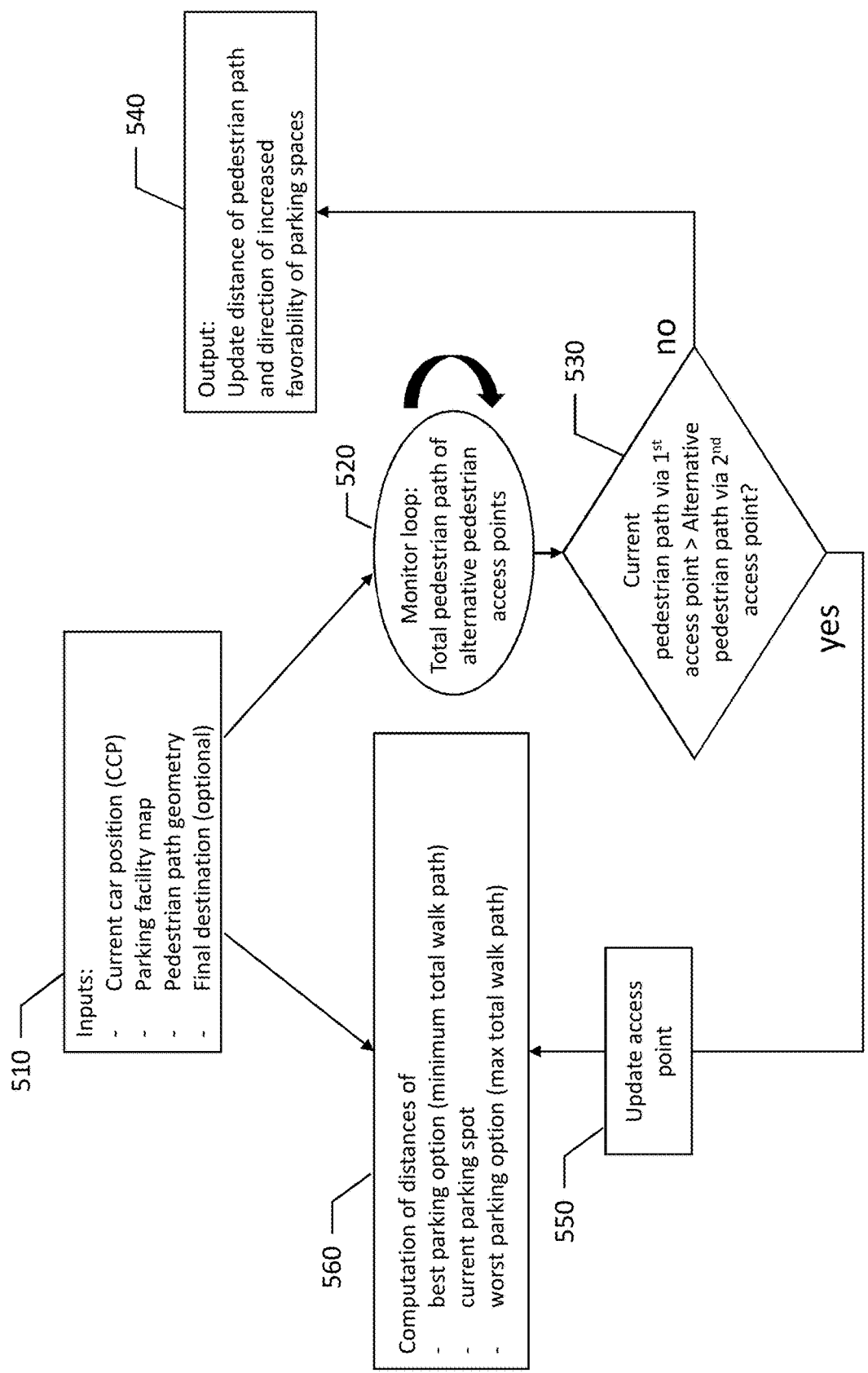
Figure 11:
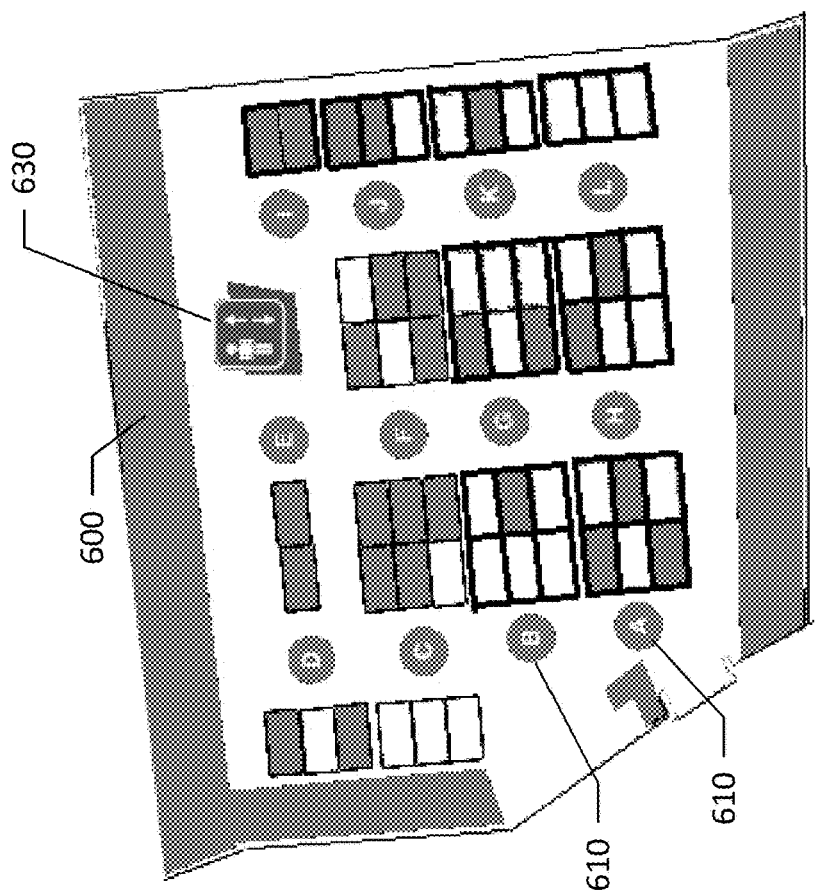
Figure 12:
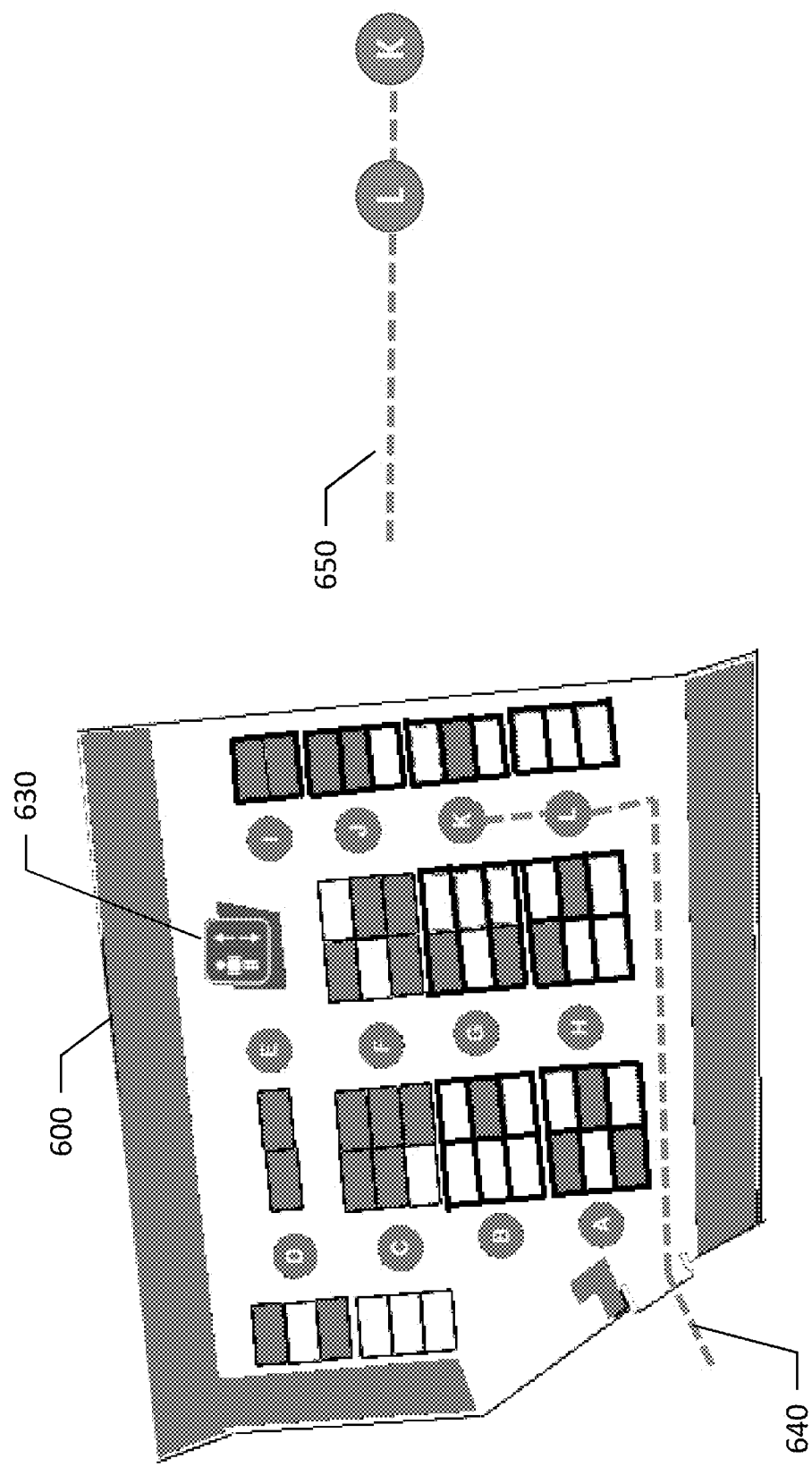
Figure 13:
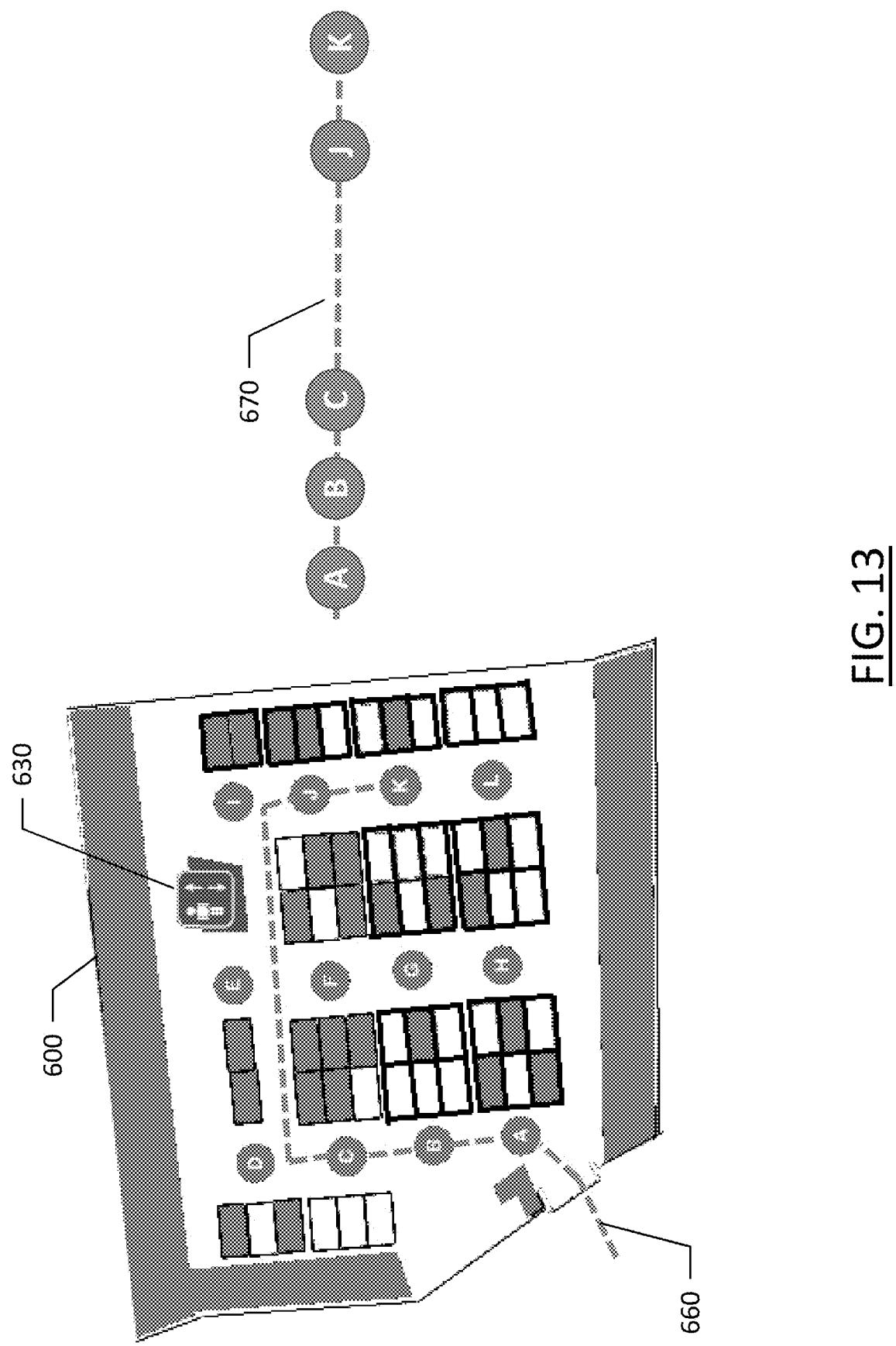
Figure 14:
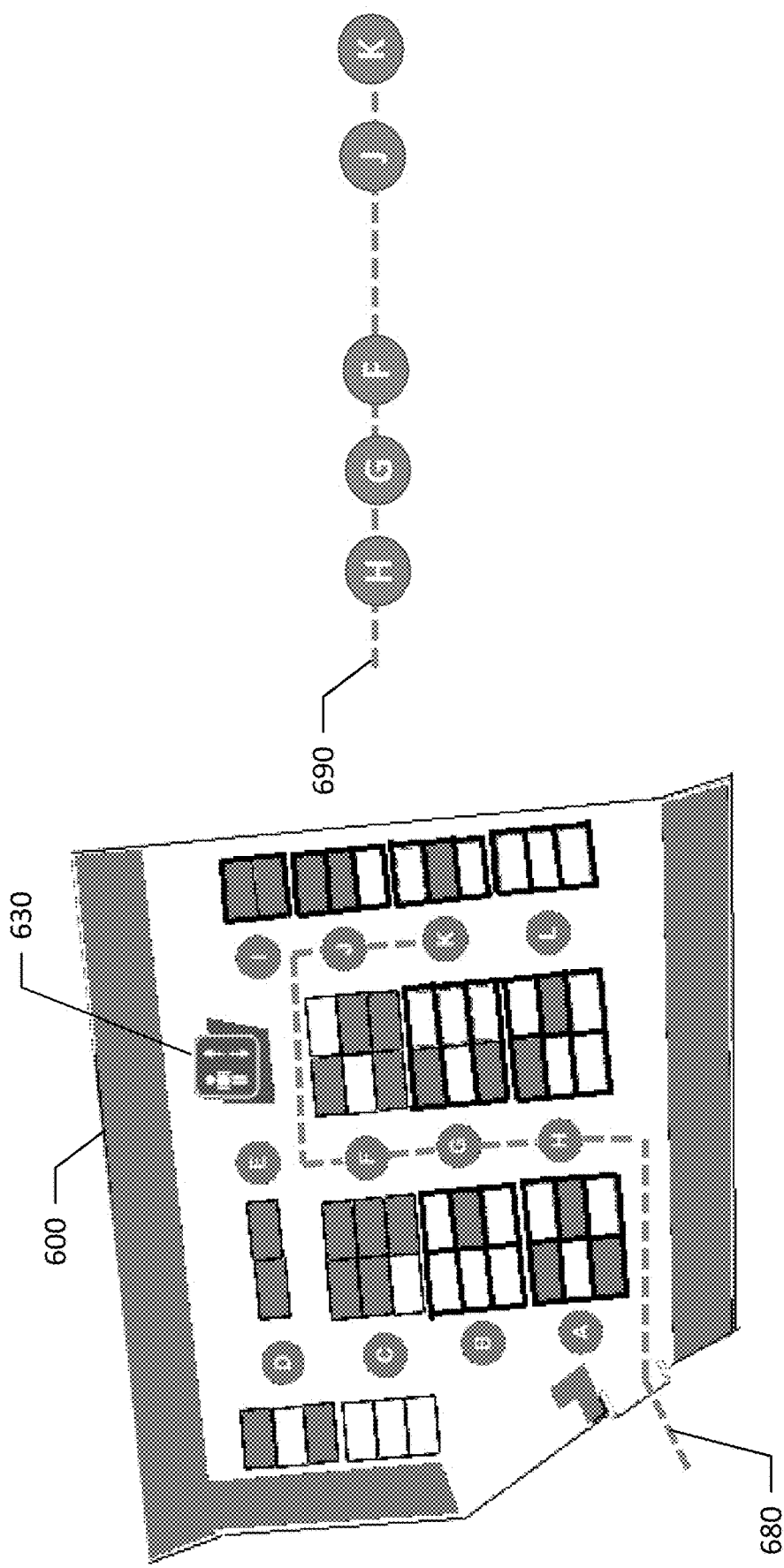
Figure 15:
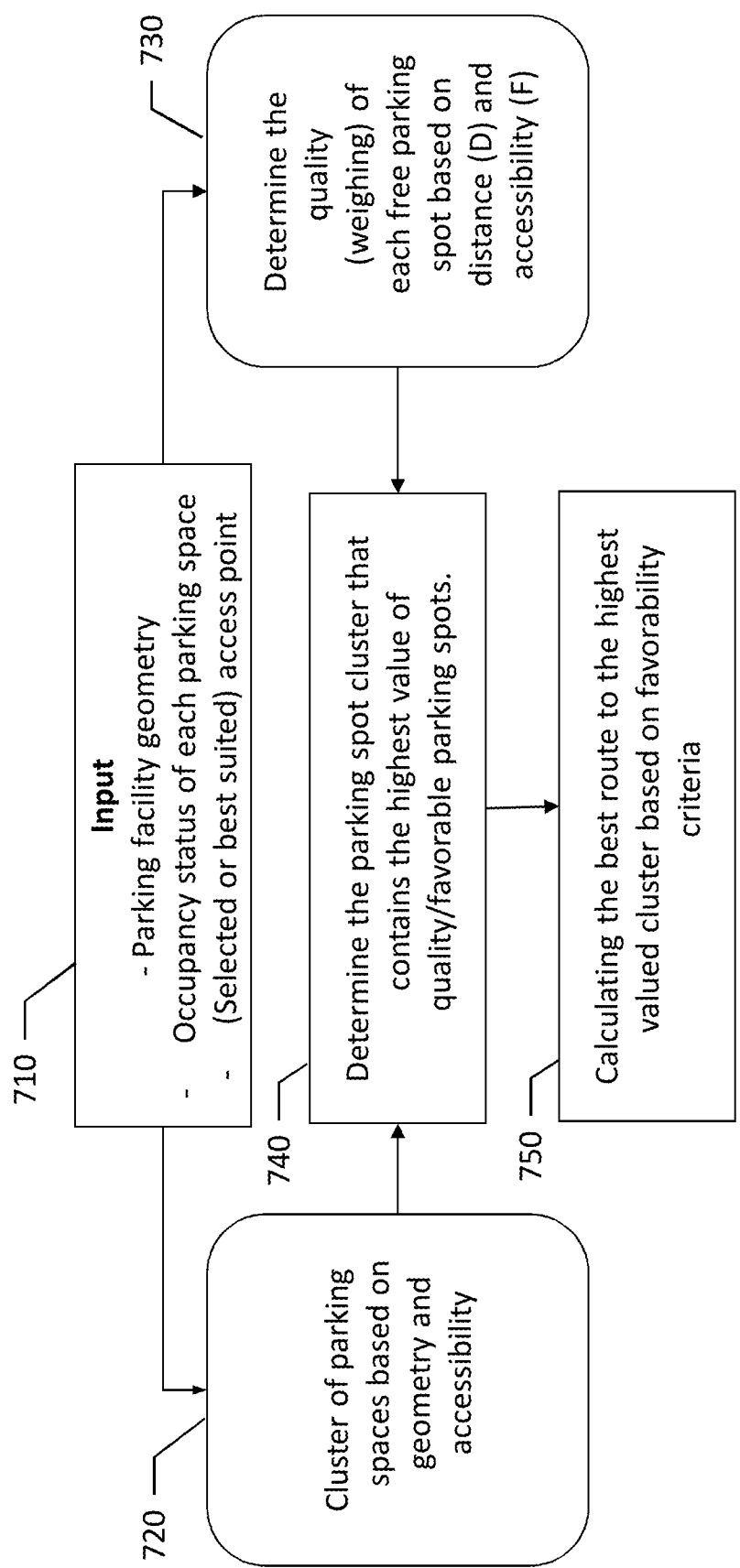
Figure 16:
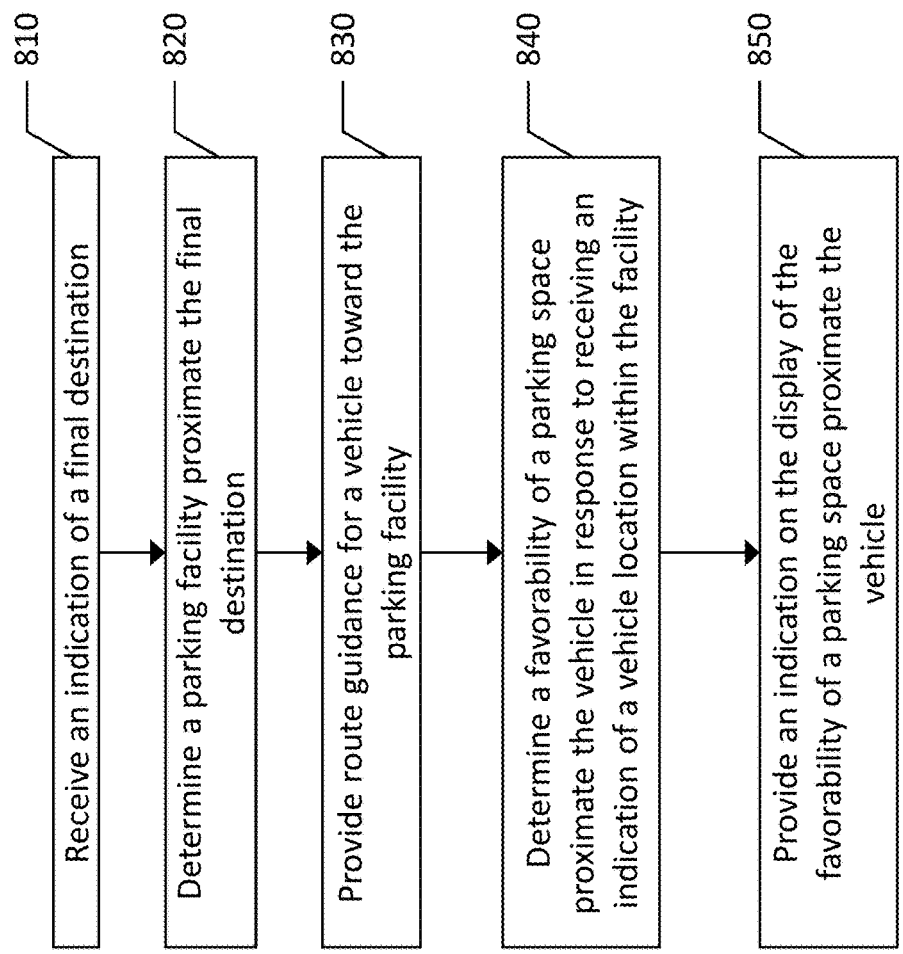

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating an indication of the favorability of a parking location in accordance with an example embodiment of the present invention;

FIG. 3 depicts a user interface including a parking structure and a graphical indication of parking favorability of parking spaces proximate a vehicle according to an example embodiment of the present invention;

FIG. 4 illustrates a user interface including a graphical user interface element depicting the favorability of parking spaces proximate a vehicle according to an example embodiment of the present invention;

FIG. 5 illustrates another user interface including a graphical user interface element depicting the favorability of parking spaces proximate a vehicle according to an example embodiment of the present invention;

FIG. 6 depicts four iterations of a graphical user interface element indicating the favorability of parking spaces proximate the location of a vehicle according to an example embodiment of the present invention;

FIG. 7 illustrates a user interface including a parking facility with two pedestrian access points and a graphical user interface element depicting the favorability of parking spaces proximate the vehicle according to an example embodiment of the present invention;

FIG. 8 illustrates the user interface of FIG. 7 including a parking facility with two pedestrian access points and a graphical user interface element depicting the favorability of parking spaces proximate the vehicle according to an example embodiment of the present invention;

FIG. 9 illustrates the user interface of FIG. 7 including a parking facility with two pedestrian access points and a graphical user interface element depicting the favorability of parking spaces proximate the vehicle according to an example embodiment of the present invention;

FIG. 10 is a flowchart illustrating the iterative monitoring loop used to reevaluate the favorability of parking spaces proximate a vehicle according to an example embodiment of the present invention;

FIG. 11 illustrates a plurality of clusters of parking spaces in a parking facility and a scoring system for rating the available parking spaces of the clusters according to an example embodiment of the present invention;

FIG. 12 illustrates a first route to a desirable cluster of parking spaces in a parking facility according to an example embodiment of the present invention;

FIG. 13 illustrates a second route to a desirable cluster of parking spaces in a parking facility according to an example embodiment of the present invention;

FIG. 14 illustrates a third route to a desirable cluster of parking spaces in a parking facility according to an example embodiment of the present invention;

FIG. 15 is a flowchart of a method for determining the rating of a cluster of parking spaces and generating a route to a highest rated cluster of parking spaces according to an example embodiment of the present invention; and FIG. 16 is a flowchart of a method for providing an indication of the favorability of parking spaces proximate a vehicle according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for providing an indication of favorability of parking locations within a parking facility by providing a graphical indication of the distance between the parking location and a pedestrian access point to the parking facility, and a graphical indication of the distance from the pedestrian access point and the final destination. Embodiments may further provide an indication of a direction of travel that would improve the favorability of parking locations, and optionally provide an indication of a type of pedestrian access to the parking facility.

Finding a parking space can be time consuming and frustrating, particularly in parking facilities such as large parking lots or multi-level parking structures or parking garages where parking spaces may be limited and the orientation of a user relative to their final destination within the parking facility may not be readily apparent to the user. When a user, such as the driver of a vehicle, is guided to a destination via route guidance of a navigation system, for example, the final destination may lack parking at the immediate location, such as an attached parking lot or designated parking for the final destination. Such an example may include when a final destination is a store located within a shopping complex, such as a mall. The individual store may not have parking proximate the store, and parking for the shopping complex may be in a facility proximate the shopping complex. Similarly, a sporting event, concert, or the like may be at a particular location which is established as the final destination, while available parking for such an event may be in one or more parking structures around the venue hosting the event. In each of these cases, navigation and route guidance for a vehicular portion of the trip may provide route guidance for a vehicle to a parking facility proximate the venue that is the final destination. Parking facilities can be large parking lots or parking structures with multiple pedestrian access points to allow a user to exit from the parking facility once their vehicle is parked. The favorability of a parking space within the facility may be unknown to a user for a variety of reasons. The user may not be aware of where the pedestrian access point(s) are relative to a parking space, the user may not be aware of the orientation of the parking facility to the final destination such that they do not know which region or floor/level within a parking facility is desirable for reaching the final destination, and the user may not be aware of the type of pedestrian access is provided at available pedestrian access points (e.g., stairs, elevators, access controlled doors, etc.). Thus, it is desirable to provide a user with an indication of the favorability of parking spaces as they travel within a parking facility. Further, in certain circumstances it may be desirable to understand the ease of egress from the parking facility from a parking space, particularly after events such as sporting events or concerts. The favorability of parking spaces may indicate an ease of egress in such circumstances.

Historically, navigation systems (e.g., embedded car navigation systems) may offer assistance in these situations by indicating parking facilities (e.g., surface parking lots, parking garages, etc.) that are nearby. The presentation of parking facilities may be triggered when a driver or user approaches a known or predicted location. However, once a parking facility is reached, navigation systems fail to provide the driver any indication of where in the parking facility they should park to most easily access their final destination.

To provide a way to indicate the favorability of parking spaces within a parking facility and to provide an indication of a direction of travel to improve the favorability of parking spaces, a system as illustrated in FIG. 1 may be provided. The system of FIG. 1 may facilitate navigation and route guidance for a user from an origin to a final destination, including directing a user to a parking facility proximate the final destination, and once the parking facility is reached, guiding the user through the parking facility by graphically indicating to a user the favorability of parking locations proximate the vehicle as the vehicle traverses the parking facility.

FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

According to example embodiments described herein, the map database 108 may further include venue maps that include. Venue maps may be of a venue that is indoor, outdoor, or a combination thereof, and may include data regarding access points (pedestrian and/or vehicular), details regarding points of interest within the venue, data representing paths within the venue (pedestrian and/or vehicular), or the like. For example, a venue map may include a map of a shopping mall, and may include entrances/exits, store locations/names, routes through the shopping mall, stairs/escalators/elevators, restrooms, etc. A venue map may also include a parking facility which may be a parking garage, parking lot, or other parking structure, and may include maps of the levels of the parking facility, pedestrian access points to the parking facility for each level of the parking facility, the type of pedestrian access (stairs, elevator, controlled access door, accessible ramps, etc.). The map database 108 may further include data regarding parking spaces (e.g., parking space type: handicap, visitor, reserved, etc.) and locations within the parking facility, travel lanes within the parking facility, vehicle entrances/exits to the parking facility, parking space types (e.g., hybrid vehicle, plug-in vehicle, handicap vehicle, compact vehicle, oversize vehicle, etc.), ramps to access other levels, etc.

Venue maps may optionally include a radio map of the venue. Electromagnetic (EM) signals, particularly from short range communication systems, such as WiFi, Bluetooth™, etc. can be recorded at different locations inside a venue, from which a radio coverage map can be derived. Such a map may provide radio positioning means to vehicles that can receive the short range communication signals as a tracking signal when positioning signals, such as GPS, are unavailable. Such radio positioning may also mitigate accumulated error that may be present in inertial measurement units, for example. Optionally, positioning within a venue may be performed via object or point-of-interest recognition, where objects referenced in a venue map may be identified by vehicle sensors. Such an embodiment may enable a vehicle to derive its position from the observations, which can be made by image sensors, light distancing and ranging (LIDAR), RADAR, or the like.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to parking space availability along different road segments of the map database, where a parking availability estimation may be generated in dependence of time of day, day of week, season of the year, special events, etc. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example. This may be of particular benefit when used for navigating within a parking facility. As many parking facilities are multi-level concrete and steel structures, network connectivity and global positioning satellite availability may be low or non-existent. In such cases, locally-stored data regarding the parking facility may be beneficial as navigation of the parking facility could be performed without requiring connection to a network or a positioning system. In such an embodiment, various other locationing methods could be used to provide vehicle reference position within the parking facility, such as inertial measuring units, vehicle wheel sensors, compass, radio positioning means, etc.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. Optionally, certain locations, such as parking facilities, may have poor GPS reception, but may have wireless access points or other signal providing/receiving means within the facility as described above. These access points may provide wireless fingerprint data to a vehicle based on the vehicle position within the facility, where the location of the vehicle can be established based on the strength of various access point signals. This may provide accurate positioning of a vehicle within such a facility. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for generating an indication of the favorability of a parking location through presentation of a representation of a route to a final destination based on the parking location. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages including materials, components and/or wires on a structural assembly.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments described herein may provide a system, method, apparatus, and computer program product for providing an indication to a user of the favorability of parking proximate a location of a vehicle. The embodiments provide a computed view that enables a user, such as a driver to see an easily understood representation of the favorability of a parking location by reducing the cognitive load associated with driving in an unfamiliar parking environment. Embodiments help a user find a suitable parking spot while not requiring information about parking occupancy by using the final destination of the journey as the central criteria for decision making for suggesting a suitable and favorable parking space. The visual presentation of a graphical user interface element may provide a readily understandable visual overview of the favorability of parking spaces proximate the vehicle in relation to the actual final destination. As such, embodiments re-actualize the purpose of the user's interactions as an in-car optimization activity.

Parking facilities, and in particular, indoor parking facilities or parking structures may be complex structures that require an increased cognitive load from a driver. The confined space, the driver focusing on finding a parking space while also navigating an unfamiliar pathway, the plurality of vehicles also focusing on finding a parking space within the confined space, and the vehicles attempting to exit the facility all contribute to a stressful environment that increases the cognitive load of a user navigating such an environment. Embodiments described herein reduce the cognitive load to a user by providing an indication of the favorability of a parking space proximate the location of the vehicle and providing an indication of the direction of travel by which the user could improve the favorability of a parking space.

Conventionally, a navigation system may provide route guidance to a user, such as a driver, from an origin, which may be the current location of a vehicle, to a destination. Conventional route guidance will provide guidance from the origin to a location as close as possible to the final destination. However, the final destination may not be accessible by vehicle, such as when the final destination is a store within a shopping mall, or when the final destination is a venue such as an airport, sports stadium, concert hall, or the like. Further, when a destination is within a dense urban setting, parking is often not available at the address of a destination, and parking must be found elsewhere. Embodiments described herein recognize the lack of available parking at a final destination, and find suitable parking facilities proximate the final destination to provide a better user experience when using the embodiments described herein.

In practice, when a user enters a final destination into a navigation system for route guidance, embodiments may recognize that the final destination lacks designated parking, such as an attached parking lot or parking specifically designated for that final destination. The system may then find a parking facility located proximate to the final destination that is available for parking. A parking facility that is designated for a specific building or that is not public may not be considered if the final destination is for a different building or if the user is not able to access the parking facility. The closest parking facility may become the interim destination for route guidance, where vehicular route guidance is provided to the parking facility. Upon the user's vehicle reaching the parking facility and entering the parking facility, embodiments described herein may begin to provide an indication of the favorability of parking spaces proximate the location of the vehicle.

The transition between route guidance from a road network to the route guidance within the parking facility may be a seamless operation. A user interface may continue to guide a user into the parking facility, while transitioning from an illustration of a map of a road network to a map of the parking facility. While the positioning mechanism used outside of the parking facility or "positioning system" may cease to properly function upon entering the parking facility (e.g., GPS), an alternative mechanism may be implemented for tracking location within the parking facility or a "tracking system", such as inertial measurement, access point signal fingerprinting, dead reckoning, or the like. While the user interface may provide route guidance to a user based on the location of the user according to the positioning system, upon reaching a parking facility with poor or limited access to the positioning system signals, the navigation system may transition to use of the tracking system. This transition may appear seamless to a user as the user interface continues to depict the position of a user/vehicle as the vehicle approaches the parking facility and subsequently enters the parking facility. The map provided for display during route guidance depicting a network of roads may transition to a route guidance system depicting the layout of the parking facility, with the location of the user depicted on the display in an easily understood manner. FIG. 3 illustrates such an example embodiment of a user interface 100, where a user is entering a parking facility 110 at 115. According to an example embodiment, the map of the parking facility 110 may provide an indication of a floor or level 120 of the parking facility that the user is on. The other available parking levels may optionally be indicated as shown in 122, 124, 126, and 128. In the illustrated embodiment, the user has entered the parking facility on the basement level "B" shown at 120. The parking spaces within the parking facility may be depicted as shown at 130. In an example embodiment in which the parking spaces include occupancy sensing, an indication of which parking spaces are available may be provided, such as by using color to distinguish available parking spaces from occupied spaces. A pedestrian access point 135 may optionally be depicted on the map of the parking facility 110.

While the parking facility map 110 shown in user interface 100 may provide a user an indication of how to navigate the parking facility, example embodiments described herein additionally provide an indication of the parking space favorability at the location proximate the vehicle to enable a user to establish whether they want to park at an available spot if they find one proximate their location. The graphical user interface to depict parking space favorability in the example embodiment of FIG. 3 is shown across the top of the display 100, including an indication of the vehicle entry point 140 to the parking facility 110 and a distance 142 from the entry point 140 to the current car position 144, shown as the current car location 145 on the map of the parking facility 110. The vehicle entry point 140 and distance 142 are optional elements and may cease to be displayed once a vehicle is within the parking facility proximate parking spaces. The current car position (CPP) 144 is shown along with an indication of the distance 146 from the current car position 144 to a pedestrian access point 148. The distance is shown reflecting the pedestrian distance, such that it can involve a route that is not traversable by a vehicle, or does not use a path that is restricted to vehicle use only. The pedestrian access point 148 may include an icon as shown in FIG. 3, reflecting the type of pedestrian access available at that point. In the instant case, the pedestrian access point type is an elevator. This feature may be beneficial to illustrate a type of pedestrian access which may be prohibitive to certain users. For example, a person in a wheel chair or a person who cannot easily climb stairs may be averse to a stairway type of pedestrian access and may avoid such a pedestrian access point. The graphical user interface further illustrates a distance 150 from the pedestrian access point 148 to the final destination 152. Cumulatively, the graphical user interface provides a comprehensive depiction of the distance from a parking space proximate the vehicle (CCP 144) to a final destination 152 including how far the user would have to walk, how they would have to exit the parking facility, and how far from the parking facility to the final destination 152.

As shown, the graphical user interface to provide an indication of a favorability of a parking space proximate the user can provide a user an easy and intuitive understanding of the favorability of a parking space proximate the vehicle by establishing a relationship between the vehicle location and the final destination via pedestrian routes to provide end-to-end guidance to a user. The graphical user interface provides a dynamic display of the overall pedestrian distance from the current car location, to a pedestrian access point to the parking facility, to the final destination. Also provided, as described further below, is an intuitive indication of the best possible parking spot based on a real time computation of the pedestrian route.

While the position of a vehicle within a parking facility may not be available using global positioning system means as noted above, other mechanisms such as dead reckoning, inertial measurement units, wheel sensors, wireless access point fingerprints, or the like can be used to establish an accurate position within an indoor environment, such as within a parking structure. At every level of an indoor parking structure (e.g., 120-128 of FIG. 3), embodiments compute the best possible pedestrian route/path between the current car position (CCP) and the selected destination. The best possible route may be the route with the shortest walking path that fulfills the user's routing criteria, which may include the avoidance of certain types of access points, such as stairs, outdoor/exposed walkways, controlled access doors, etc. These dynamically generated paths may be compared against the longest possible path on a given floor (e.g., the path from the furthest parking position to an access point) and the shortest possible path (e.g., the parking spot closest to an access point of the parking facility). The distance between the shortest and longest possible routes may be used as a reference to determine the favorability of the current car position. This may be presented to a user by a scaling technique as detailed further below, by scaling the length of the icon 146 based on the current car position. This information may be used to create a novel display that also includes the direction to the access point and a user friendly view of the parking positions.

According to some embodiments, the icon of the current car position 144 may provide an indication of a direction in which to travel in order to improve the favorability of a parking space. In the illustrated embodiment of FIG. 3, that direction is illustrated by the direction that the car icon in CPP 144 is facing. FIG. 4 illustrates an example embodiment in which the car icon in CPP 144 is turned and aligned with the direction in which parking space favorability would be improved. As shown, a vehicle position 201 is shown within the parking facility 110 on display 100. A path 205 from the vehicle to the closest parking facility access point is shown on the display 100, and identified in the parking space favorability user interface element 250 by element 146, which also indicates the pedestrian path 205 distance of 24 meters. The parking facility access point type is shown within the parking structure at 210 with an icon indicating an elevator, as shown in parking space favorability user interface element 250 by element 148. The direction in which the parking facility access point 210 is relative to the vehicle position 201 is shown by CPP element 144, which shows the car aligned in a direction toward the parking facility access point 210. Arrow 220, which is at an angle α relative to the heading of the vehicle. This same direction is indicated by arrow 222 of the CPP element 144. The arrows 220 and 222, along with the angle α are shown for ease of understanding, and need not be present in the display 100 of an example embodiment. The direction in which the vehicle of the CPP element 144 is pointing signifies to a user that if they wish to improve the favorability of parking proximate the vehicle, the desirable direction is in alignment with the heading of the vehicle in CPP element 144.

Another example embodiment of providing an indication of the direction in which the favorability of parking spaces will improve is shown in FIG. 5. As shown, the vehicle icon in CPP element 144 remains in a fixed direction, such as may be the case in a "static map" or a "north-up" user interface where the compass direction of north is always toward the top of the display. In such an embodiment, the position of the arrow 244 may rotate about the CPP element 144 to provide an indication of the direction in which parking favorability improves relative to the present heading of the vehicle. As the vehicle navigates through the parking facility, the heading of the vehicle in the icon of CPP element 144 may remain toward the top of the display while the arrow 244 will change as the vehicle turns.

As the vehicle at vehicle position 201 gets closer to the parking facility access point 210 indicated by icon 148, the distance for the calculated pedestrian path 205 becomes shorter, and this shortened distance is reflected in the shortening of element 146. In the example embodiment of FIGS. 4 and 5, an indication of the length of the pedestrian path is also indicated; however, this is not necessary and the distance may be conveyed merely through the length of element 146. FIG. 6 illustrates such an example where there are four iterations of the parking space favorability user interface element 260, 270, 280, and 290. These four iterations represent an example embodiment in which a vehicle is moving closer to a pedestrian access point to the parking facility progressively. While four iterations of the parking space favorability user interface element are shown, it is appreciated that only one will be presented on the display at any given time. The distances 360, 370, 380, and 390, are all relative distances. The basis for the relative distances may be established through an analysis of the parking facility, which may be information that is previously established and stored with the parking facility information in the map database 108, or it may be analyzed locally by a navigation system, for example, upon arrival at a parking facility. The analysis of the parking facility obtains the distance from a parking space that is furthest from the pedestrian access point to the parking facility and the distance from a parking space that is closest to the pedestrian access point to the facility. This may be done on a per-level basis in a multi-level parking facility. The distance may be representative of a calculated pedestrian path to the pedestrian access point, or the absolute distance of the parking space from the access point. In each case, the furthest distance is established as the worst-case scenario parking space on that level of the parking facility. The closest space is identified as the best-case scenario. This provides the relative distance reference points for determining the favorability of the parking space.

In the example embodiment of FIG. 6, the distances 360, 370, 380, and 390, each comprise one or more elements that make up the graphical indication of the distance. The longest distance corresponding to the parking space of lowest favorability may be four elements as shown by 360. The shortest distance corresponding to the parking space of highest favorability may be one element as shown by 390. As such, the parking space favorability user interface elements may represent "poor" with 260, "moderate" with 270, "good" with 280, and "best" with 290. The criteria used to establish "poor", "moderate", "good", and "best" may be pre-defined or adjusted according to user preference. For example, the user may provide an indication to the system that a parking space that is less than 50 feet from a pedestrian access point is close enough to be regarded as a "best" parking space. The distance to the pedestrian access point may be specified in a variety of ways, such as in a distance measure (e.g., feet or meters), fractions or percentages of the worst/best parking space distance, or per user feedback (e.g., crowd sourced feedback regarding a particular parking space from users who have previously parked in or near that space). Further, the visual indication shown by the distances 360, 370, 380, and 390, may optionally be distinguished by colors, such as a red hue indicating a poor parking favorability, while a green hue may represent a good parking favorability.

As noted above, the ease of egress may contribute to the degree of favorability of a parking space within a parking facility. As such, the proximity of a parking space to a vehicle exit of the parking facility or to a vehicle exit from a certain level of a parking facility may be considered when indicating the favorability of a parking space. This may be incorporated into the overall favorability indicated by the graphical user interface, or may be indicated by an additional icon in the parking space favorability user interface element. The distance to a vehicle exit may be marked by a distance indicator supplementing the user interface element that enables a user to consider the distance to the exit when selecting a parking space. Optionally, a user may specify if easy egress is an important consideration for a parking space, such as if they are attending an event where many people will be departing simultaneously or around the same time. The type of venue or final destination may optionally provide an indication to the system that easy egress is desirable, such as if a user enters a concert venue or stadium as their final destination, example embodiments may interpret that to suggest that easy vehicle egress will be desirable. Optionally, a parking location may be deemed more favorable if it is proximate a vehicle egress that would place a user on the fastest route to a subsequent destination, such as home after a concert or after a shopping trip. The subsequent destination may be presumed to be the user's home, or optionally, the subsequent destination may be drawn from a user's personal calendar or schedule where the schedule indicates a future location of the user.

According to some embodiments, in the event a user reaches a location that is proximate the best-case parking space favorability, such as adjacent to a pedestrian access point to the parking facility, and the user does not park the vehicle at such a location, it may be determined that the best-case parking spaces are not available. In such an embodiment, the parking space identified as the closest space may be established as unavailable, and the next closest parking space may be established as the best-case scenario, thus adjusting the relative rating of parking favorability shown in FIG. 6. This dynamic adjustment of the best-case scenario for parking may provide a more realistic rating of the parking space favorability based on what is presumed to be available.

While the example embodiments above have described scenarios in which there may only be a single pedestrian access point to a parking facility, many parking facilities have multiple pedestrian access points. Embodiments described herein may perform iterative calculations to determine the parking spaces with the highest favorability while selecting the most appropriate pedestrian access point for the favorability determination.

FIG. 7 illustrates an example embodiment of a parking facility 410 or level of a parking facility having two pedestrian access points 420 and 425. As shown, an icon indicates that pedestrian access point 425 is an elevator or lift, while pedestrian access point 420 is a stairwell. As the vehicle 430 of the user enters the parking facility 410 or level of the parking facility via entrance 435, the parking space favorability user interface element 440 of the display 400 provides an indication of the direction in which parking favorability increases via arrow 445 on the current car position icon 450. The distance from the pedestrian access point 425 is illustrated as a favorable four meters in element 455. The pedestrian access point 425, which is an elevator, is represented in the parking space favorability user interface element 440 by element 460 corresponding to an elevator. While the distance from the pedestrian access point 425 to the final destination 470 is represented by element 465 indicating a distance of 15 meters.

FIG. 8 illustrates the example embodiment of FIG. 7, where the vehicle 430 has driven further into the parking facility 410, away from pedestrian access point 425. As shown, the distance shown in element 455 has increased, while the arrow 445 indicating the direction in which parking favorability increases has shifted and remains pointed toward the pedestrian access point 425. The distance between the pedestrian access point 425 and the final destination (represented by 470) remains unchanged as it is the same pedestrian access point as in FIG. 7. The system of example embodiments conducts a monitoring loop as described further below to reevaluate the position of the vehicle within the parking facility, the favorability of parking spaces proximate the vehicle, and the walking (pedestrian) distances from the revised position of the vehicle.

As the vehicle 430 drives further away from pedestrian access point 425, the monitoring loop continues to evaluate the position of the vehicle within the parking structure. As there is a second pedestrian access point 420, as the vehicle gets further from pedestrian access point 425, pedestrian access point 420 becomes more favorable. Further, a scenario may exist whereby a user has driven close to pedestrian access point 425, but continued on suggesting that no parking spaces are close to access point 425. In such a scenario, the parking spaces past by that are deemed "good" or "best" may be discarded from consideration for a predetermined period of time (e.g., thirty minutes) influencing the favorability of a rating of other parking spaces. The predetermined period of time may be a time period dependent upon a parking facility and may be deemed a time within which it is probable that a vehicle has left a parking space. For example, in an hourly parking garage at an airport, the time period may be thirty minutes. However, in a long-term parking facility where vehicles park for days at a time, the time period may be 24 hours. Referring back to the figures, FIG. 9 depicts a point after which the favorability of pedestrian access point 420 has become greater than that of pedestrian access point 425. As shown, the arrow 445 now points toward pedestrian access point 420 indicating an increase in favorability of parking toward pedestrian access point 420. Further, the distance indicated by element 455 has changed to reflect the distance of the vehicle 430 from pedestrian access point 425. The pedestrian access type has also changed as indicated by element 460 reflecting a stairwell pedestrian access point. Finally, the distance between the pedestrian access point 420 and the final destination 470 has also been updated to reflect the change in distance from the new pedestrian access point to the final destination. It is noted that the switch from a first pedestrian access point to an alternative pedestrian access point may optionally take place only if the overall route (e.g., the walking distance from the parking space to the final destination 470) is shorter than the overall route with the first pedestrian access point.

According to example embodiments described herein, the favorability of parking spaces proximate the vehicle may be established using a number of factors. The distance of the vehicle from a pedestrian access point is one of those factors, but since different pedestrian access points may be different distances from the final destination, embodiments may not provide an indication of increased favorability of parking to the closest pedestrian access point, but instead to the pedestrian access point that provides the most desirable/favorable cumulative path from the parking space to the final destination. Further, the pedestrian access point type may be considered. As shown in FIG. 9, one pedestrian access point 425 is an elevator, while the other is a stairwell. A user may indicate, such as in the user preferences of the navigation system, that stairs are undesirable or prohibitive to a user. In such an embodiment, the pedestrian access point 420 of a stairwell may not be considered viable, and the parking favorability of the embodiment of FIG. 9 may only be indicated relative to the pedestrian access point 425 having an elevator, regardless of how close the vehicle may be to pedestrian access point 420 having stairs.

The favorability of parking spaces may also consider user-specific preferences or requirements, such as a size of the vehicle for which a parking space is sought. For example, if a user is driving a large vehicle, parking spaces that are "compact vehicle only" may be omitted from consideration. Similarly, vehicles over a certain height may be restricted to certain parking spaces whereby the graphical user interface element to indicate the favorability of parking spaces may omit under-height parking spaces from consideration when determining the relative favorability of parking spaces proximate the vehicle. In some embodiments, parking facilities may have restricted parking spaces, such as reserved spaces, visitor spaces, hybrid vehicle or plug-in vehicle spaces, handicap spaces, or the like. A user may be able to select a type of space that they are seeking to enable the system to consider only parking spaces that meet the criteria selected by a user. In an instance in which a user selects a handicap space, the system may provide an indication of the favorability of regular parking spaces in addition to including handicap parking spaces in the consideration. In an instance in which a user selects a plug-in vehicle space, the system may cease to consider any vehicle space that is not equipped with a plug-in charger for a vehicle.

FIGS. 10, 15, and 16 illustrate flowcharts of a methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 10 illustrates a method of performing a monitoring loop to assess the best possible pedestrian path to the final destination to inform a user of the favorability of parking spaces proximate the vehicle of the user. As shown at 510, inputs include the current car position (CPP) which may be established, for example, through dead reckoning, inertial measurement units, etc. as described above, a map of the parking facility, pedestrian path geometry of the parking facility, and the final destination. The final destination may be optional. The inputs are used for a monitoring loop at 520 that establishes the total pedestrian path using alternative pedestrian access points to a parking facility. At 530, a determination is made as to whether the current pedestrian access point to which the graphical user interface is directing a user for more favorable parking has the shortest pedestrian path. If the current pedestrian path via a first pedestrian access point is the shortest path or most desirable path, the system updates the distance of the pedestrian path (e.g., 455) and the direction of the arrow (e.g., arrow 445) indicating an increase in favorability of parking spaces as shown at 540. If it is determined at 520 that a different pedestrian access point provides a shorter or more desirable pedestrian path to the final destination, an update to the pedestrian access point is made at 550 to select the alternative access point. The system then establishes the best parking option (minimum total walk path) and the worst parking option (maximum total walking path) for the new pedestrian access point, and assesses the parking space favorability proximate the vehicle at 560.

While embodiments described above provide an indication of the favorability of parking spaces proximate a vehicle, an indication of the pedestrian path to the final destination, and a direction in which parking favorability can be increased, embodiments described herein may optionally provide optimized routes through a parking facility based on abstracted parking spot availability in order to maximize the opportunity for a user to find the best available parking space relative to their final destination. Embodiments described above direct a user toward parking spaces with higher favorability; however, an optimal route can provide a user the best chance at finding the most suitable and promising route through a parking facility informed by the likely availability of parking spaces along the route. While parking availability may be found in the prior art, prior methods fail to consider the favorability of parking or routing a vehicle through a parking facility based on availability and favorability of parking spaces. Embodiments described herein assess parking availability and favorability based on parking space clusters, accessibility, proximity to pedestrian access points, and closer alternative parking spaces.

Embodiments described herein provide a method that calculates an optimized route through a parking facility by rating the favorability of available parking spaces using the walking distance to the pedestrian access points, alternatives of parking spaces in the vicinity, accessibility to the parking space, parking facility geometry, and shortest/fastest routes. Inputs to the algorithm for generating the route through a parking facility may include information gathered based on the venue or parking facility map data, including the walking path distance to pedestrian access points, other parking spaces in the vicinity, accessibility to the parking space, and the parking facility geometry. Using this information, together with parking space availability data, which may be provided by the parking facility, embodiments may compute one or more routes that matches the given availability of the parking spaces in the parking facility. The parking space favorability may be considered, as described above, for individual parking spaces, and using the parking availability, the parking space availability and the analysis of clusters of parking spaces with the highest availability may be considered in establishing a route through a parking facility.

Embodiments described herein may rate regions of a parking facility based on criteria that supports desirability, favorability, and availability of parking spaces. Criteria such as the walking distance from the region or cluster of parking spaces in a region to a pedestrian access point, the availability of parking spaces in the cluster of parking spaces, and the space around parking spaces or accessibility of the parking space.

FIG. 11 illustrates an example embodiment of a level of a parking structure 600, where the parking structure level includes a plurality of clusters, each identified by a cluster point letter 610. The clusters are associated with parking spaces proximate the cluster point. Cluster point "E" for example has a single parking space, which is occupied as indicated by the shading, while cluster point L is associated with six parking spaces, only one of which is occupied. The chart 620 lists the cluster points A through L, and a rating is generated based on three factors. The distance to the closest pedestrian access point is rated from one being the farthest, to ten being the closest to a pedestrian access point. As shown, cluster point E is adjacent to the access point 630, such that it receives a distance score of "10". Cluster point A is furthest from the access point 630, and receives a distance score of "2". The availability score shown in the third column indicates the number of parking spaces available in the cluster. This ranges from one to six, since six is the maximum number of parking spaces associated with any single cluster point in the parking structure level 600. Finally, a space factor ranging from zero to two is shown in the fourth column indicating the space around the available parking spaces. As shown in cluster D, the single available parking space has no room adjacent to it, either by empty space or an adjacent available parking space, so the score is "1". Cluster E has no available parking spaces, so the space factor score is "0". However, clusters K and L each have three adjacent parking spaces open, such that the space around an available space, such as the middle space, is the highest possible and scores a "2" for space factor. The distance score, availability score, and space factor combine to form a rating. In the illustrated embodiment, the rating is calculated by adding the distance score to the availability score, and multiplied by the space factor to obtain a rating. In the embodiment of FIG. 11, cluster K has the highest rating, and may be highlighted on a displayed map of the parking facility.

The value of each available parking space is calculated based on a rating of the walking distance (D) to the pedestrian access point multiplied by the accessibility factor (F). Each free parking space receives a rating as described above, between one and ten, with the shorter walking distance to the pedestrian access point being a higher score. The accessibility factor is established based on the following: if both neighboring parking spaces of the parking space in question are occupied, the accessibility factor is set to one; if the parking space has one free neighboring parking space on the left or right, the accessibility factor is one-and-a-half; if both neighboring parking spaces (left and right) are available, the parking space availability factor is at its maximum value of two.

According to example embodiments described herein, one or more routes through the level of the parking facility may be generated based on the rating of the clusters of the parking facility level. FIG. 12 illustrates an example embodiment of a first calculated route 640 through the level of the parking facility 600, where the route proceeds from the entrance to the parking facility to cluster L, and then finally to cluster K. This route is illustrated in linear form by 650, which indicates the parking clusters through which the route passes on the way to the final cluster. FIG. 13 provides a second calculated route 660 which passes through clusters A, B, and C before proceeding to cluster J and finally cluster K. This is shown in linear form at 670. Finally, a third route is calculated to reach the most desirable cluster, as shown in FIG. 14, which depicts a route 680 advancing through clusters H, G, F, and J before arriving at cluster K. Among the three calculated routes to reach the cluster with the highest rated parking availability (cluster K), the routes are scored based on several factors. The better a best parking cluster is, the shorter or more direct the calculated route to that cluster. The worse the most desirable (highest scoring) cluster, the more modifications or detours are made based on the availability of the next best clusters that are closest to the pedestrian access point before reaching the highest scoring cluster. The number of free parking spaces along the route are also considered. An example embodiment of the determination of a route is described below.

If "C" is the cluster with the highest rating, "# C" is the number of parking spots in C, "C*" is the highest rated parking cluster closer to the pedestrian access point with minor deviation from the shortest route to "C", "# C*" is the number of parking spots in "C*", and "C**" is another relatively high rated parking cluster close to "C". The simplified decision tree may be represented as follows:

---

IF #C > 4 AND walkdistance (C) < 20 meters, THEN find shortest route to C

IF (#C < 3 OR walkdistance (C) > 20 meters) AND #C* > 2, THEN find shortest route to C with detour to C*

IF (#C < 3 OR walkdistance (C) > 20 meters) AND #C* < 2, THEN find shortest route to C with detour over C* and C**

---

Embodiments described herein provide a route within the parking facility to the cluster with the best rated availability, allowing a user to focus on the route rather than hunting for a parking space or viewing a map only of available spaces and having to decipher the best available space, particularly if the environment is unfamiliar. This reduces cognitive load to a driver to find a spot while driving in a parking facility. Techniques described herein provide a driver with the best route to the best available options in terms of parking availability, and does not focus on the availability of only a single space, as such a space can become occupied while a user is driving to that specific space. Methods described herein also compensate for the failures of parking space sensors that may improperly suggest that a parking space is available when it is not. Further, focusing on a single parking space rather than a cluster as described herein could lead a driver to a space that is too narrow, has an obstacle in the space (e.g., shopping cart), or is otherwise undesirable.

FIG. 15 illustrates a flowchart of a method for establishing routes through a parking facility to a cluster of parking spaces with the highest rating based on the factors described above. At 710, the inputs include: the parking facility geometry, such as a map of the parking facility, parking space layout, and pedestrian access points; occupancy status of each parking space, which may be provided by the parking facility via sensors at the clusters or parking spaces; and the selected or best suited pedestrian access point to the parking facility. At 720, parking spaces are clustered based on accessibility and geometry. For example, all parking spaces in a cluster must be accessible from a similar point such that they can be treated together. At 730 the quality of each free parking space is determined based on the distance to the pedestrian access point and the accessibility of the parking space. At 740, the cluster with the highest rating of parking spaces is determined as described above with respect to FIG. 11. The best route to the highest valued cluster is calculated at 750 based on the algorithm described above.

FIG. 16 illustrates a method of providing an indication of the favorability of parking spaces proximate a vehicle within a parking facility. As shown, at 810 an indication of a final destination is received. A parking facility proximate the final destination is determined at 820. Route guidance is provided at 830 for a vehicle toward the parking facility. A determination is made of the favorability of a parking space proximate the vehicle in response to receiving an indication of a vehicle location within the parking facility at 840; and an indication of the parking facility is provided for display at 850.

In an example embodiment, an apparatus for performing the method of FIG. 16 above may comprise a processor (e.g., the processor 202) configured to perform some or each of the operations (510-560, 710-750, and 810-850) described above. The processor may, for example, be configured to perform the operations (510-560, 710-750, and 810-850) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560, 710-750, and 810-850 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A navigation system comprising a display to provide route guidance and at least one processor and at least one non-transitory memory including computer program code instructions, the computer program code instructions configured to, when executed, cause the system to at least:
receive an indication of a final destination;
determine a parking facility proximate the final destination;
provide route guidance for a vehicle toward the parking facility;
determine a favorability of a parking space proximate the vehicle in response to receiving an indication from a positioning system of vehicle location within the parking facility, wherein the favorability is a relative measure of a path from the parking space proximate the vehicle to the final destination between a longest path and a shortest path to the final destination; and
provide an indication on the display of the favorability of a parking space proximate the vehicle wherein the indication of the favorability of a parking space proximate the vehicle comprises:
an indication of a distance from the vehicle to a pedestrian access point to the parking facility;
an indication of a distance from the pedestrian access point to the final destination, and
an indication of a direction of travel within the parking facility for parking spaces with improved favorability of parking space location.

2. The navigation system of claim 1, wherein the system is further caused to:
determine a furthest distance from a parking space of the parking facility to a pedestrian access point of the parking facility; and
determine a shortest distance from a parking space of the parking facility to a pedestrian access point of the parking facility,
wherein the indication of the favorability of a parking space is determined based, at least in part, on a distance of the vehicle from a pedestrian access point of the parking facility relative to the furthest distance and the shortest distance.

3. The navigation system of claim 1, wherein the system is further caused to:
determine a parking space having a largest combined distance from a pedestrian access point of the parking facility and a distance from the same pedestrian access point to the final destination; and
determine a parking space having a shortest combined distance from a pedestrian access point of the parking facility and a distance from the same pedestrian access point to the final destination,
wherein the indication of the favorability of a parking space is determined based, at least in part, on a combined distance of the vehicle from a pedestrian access point of the parking facility and a distance from that same pedestrian access point to the final destination relative to the largest distance and the shortest distance.

4. The navigation system of claim 1, wherein the indication of the favorability of a parking space proximate the vehicle further comprises:
an indication of a type of pedestrian access at the pedestrian access point, wherein the type of pedestrian access comprises at least one of: one or more stairs, an elevator, an escalator, a moving walkway, an accessible ramp, or an access controlled portal.

5. The navigation system of claim 4, wherein the indication of the favorability of a parking space proximate the vehicle comprises an indication of the favorability based, at least in part, on the type of pedestrian access at the pedestrian access point according to user defined preferences for types of pedestrian access.

6. The navigation system of claim 1, wherein the system is further caused to:
determine a favorability of a parking space proximate the vehicle in the parking facility in response to receiving an indication that a location of the vehicle within the parking facility has changed.

7. The navigation system of claim 6, wherein causing the system to determine a favorability of a parking space proximate the vehicle in the parking facility comprises causing the system to:
determine a first total pedestrian path including a distance to a first, closest pedestrian access point to the parking facility and a distance from the first pedestrian access point to the final destination;
determine a second total pedestrian path including a distance to a second, different pedestrian access point to the parking facility and a distance from the second pedestrian access point to the final destination; and
indicate favorability of a parking space proximate the vehicle based on a shorter of the first total pedestrian path and the second total pedestrian path.

8. The navigation system of claim 1, wherein the final destination comprises an entrance to a venue, wherein the venue comprises a plurality of entrances, wherein causing the system to determine a favorability of a parking space proximate the vehicle comprises causing the system to:
determine one or more pedestrian paths from the vehicle location to one or more pedestrian access points to the parking facility;
determine one or more pedestrian paths from each of the one or more pedestrian access points to one or more of the plurality of entrances to the venue; and
select one of the one or more pedestrian paths from the vehicle location to one of the one or more pedestrian access points and one of the one or more pedestrian paths from the one of the one or more pedestrian access points to one of the plurality of entrances to the venue according to the combination of pedestrian paths from the vehicle location to one of the plurality of entrances to the venue that provides the shortest distance,
wherein providing an indication of a distance from a pedestrian access point to the parking facility and an indication of a distance from the pedestrian access point to the final destination comprises the selected ones of the pedestrian path from the vehicle location to the pedestrian access point and the pedestrian access point to the one of the plurality of entrances to the venue.

9. The navigation system of claim 1, wherein the system is further caused to:
   determine parking availability of each of a plurality of clusters of parking spaces; and
   provide route guidance within the parking facility to a cluster of parking spaces determined to have parking availability.

10. The navigation system of claim 9, wherein determining parking availability comprises causing the system to at least:
    determine occupancy status of parking spaces within the parking facility; and
    determine a value of available parking spaces within each of a plurality of clusters of parking spaces within the parking facility, wherein causing the system to provide route guidance within the parking facility to a cluster of parking spaces comprises causing the system to provide route guidance within the parking facility to a cluster of parking spaces having the highest determined value.

11. The navigation system of claim 10, wherein causing the system to provide route guidance within the parking facility to the cluster of spaces having the highest determined value comprises causing the system to evaluate other clusters of spaces having parking availability, and generate a route that passes through at least one other cluster of spaces having parking availability, wherein the generated route is not the most direct route.

12. A computer program product comprising at least one non-transitory computer-readable storage medium having computer-executable program code instructions stored therein, the computer-executable program code instructions comprising program code instructions to:
    receive an indication of a final destination;
    determine a parking facility proximate the final destination;
    provide route guidance for a vehicle toward the parking facility;
    determine a favorability of a parking space proximate the vehicle in response to receiving an indication from a positioning system of a location of the vehicle within the parking facility, wherein the favorability is a relative measure of a path from the parking space proximate the vehicle to the final destination between a longest path and a shortest path to the final destination; and
    provide an indication of the favorability of a parking space proximate the vehicle wherein the indication of the favorability of a parking space proximate the vehicle comprises:
        an indication of a distance from the vehicle to a pedestrian access point to the parking facility;
        an indication of a distance from the pedestrian access point to the final destination, and
        an indication of a direction of travel within the parking facility for parking spaces with improved favorability of parking space location.

13. The computer program product of claim 12, further comprising program code instructions to:
    determine a furthest distance from a parking space of the parking facility to a pedestrian access point of the parking facility; and
    determine a shortest distance from a parking space of the parking facility to a pedestrian access point of the parking facility,
    wherein the indication of the favorability of a parking space is determined based, at least in part, on a distance of the vehicle from a pedestrian access point of the parking facility relative to the furthest distance and the shortest distance.

14. The computer program product of claim 12, further comprising program code instructions to:
    determine a parking space having a largest combined distance from a pedestrian access point of the parking facility and a distance from the same pedestrian access point to the final destination; and
    determine a parking space having a shortest combined distance from a pedestrian access point of the parking facility and a distance from the same pedestrian access point to the final destination,
    wherein the indication of the favorability of a parking space is determined based, at least in part, on a combined distance of the vehicle from a pedestrian access point to the parking facility and a distance from that same pedestrian access point to the final destination relative to the largest distance and the shortest distance.

15. The computer program product of claim 12, wherein the indication of the favorability of a parking space proximate the vehicle further comprises:
    an indication of a type of pedestrian access at the pedestrian access point, wherein the type of pedestrian access comprises at least one of: one or more stairs, an elevator, an escalator, a moving walkway, or an access controlled portal.

16. The computer program product of claim 15, wherein the indication of the favorability of a parking space proximate the vehicle comprises an indication of the favorability based, at least in part, on the type of pedestrian access at the pedestrian access point according to user defined preferences for types of pedestrian access.

17. The computer program product of claim 12, further comprising program code instructions to:
    determine a favorability of a parking space proximate the vehicle in the parking facility in response to receiving an indication that a location of the vehicle within the parking facility has changed.

18. The computer program product of claim 17, wherein the program code instructions to determine a favorability of a parking space proximate the vehicle in the parking facility comprises program code instructions to:
    determine a first total pedestrian path including a distance to a first, closest pedestrian access point to the parking facility and a distance from the first pedestrian access point to the final destination;
    determine a second total pedestrian path including a distance to a second, different pedestrian access point to the parking facility and a distance from the second pedestrian access point to the final destination; and
    indicate favorability of a parking space proximate the vehicle based on a shorter of the first total pedestrian path and the second total pedestrian path.

19. The computer program product of claim 12, wherein the final destination comprises an entrance to a venue, wherein the venue comprises a plurality of entrances, wherein the program code instructions to determine a favorability of a parking space proximate the vehicle comprises program code instructions to:
    determine one or more pedestrian paths from the vehicle location to one or more pedestrian access points of the parking facility;

determine one or more pedestrian paths from each of the one or more pedestrian access points to one or more of the plurality of entrances to the venue; and select one of the one or more pedestrian paths from the vehicle location to one of the one or more pedestrian access points and one of the one or more pedestrian paths from the one of the one or more pedestrian access points to one of the plurality of entrances to the venue according to the combination of pedestrian paths from the vehicle location to one of the plurality of entrances to the venue that provides the shortest distance, wherein providing an indication of a distance from a pedestrian access point of the parking facility and an indication of a distance from the pedestrian access point to the final destination comprises the selected ones of the pedestrian path from the vehicle location to the pedestrian access point and the pedestrian access point to the one of the plurality of entrances to the venue.

20. The computer program product of claim 12, further comprising program code instructions to:

determine parking availability of each of a plurality of clusters of parking spaces; and provide route guidance within the parking facility to a cluster of parking spaces determined to have parking availability.

21. The computer program product of claim 20, wherein the program code instructions to determine parking availability comprises program code instructions to:

determine occupancy status of parking spaces within the parking facility; and determine a value of available parking spaces within each of a plurality of clusters of parking spaces within the parking facility, wherein the program code instructions to provide route guidance within the parking facility to a cluster of parking spaces comprises program code instructions to provide route guidance within the parking facility to a cluster of parking spaces having the highest determined value.

22. The navigation system of claim 20, wherein the program code instructions to provide route guidance within the parking facility to the cluster of parking spaces having the highest determined value comprises program code instructions to evaluate other clusters of spaces having parking availability, and generate a route that passes through at least one other cluster of spaces having parking availability, wherein the generated route is not the most direct route.

23. A method comprising:

providing route guidance for a vehicle within a parking facility;

determining a favorability of a parking space proximate the vehicle in response to receiving an indication from a positioning system of vehicle location within the parking facility, wherein the favorability is a relative measure of a path from the parking space proximate the vehicle to the final destination between a longest path and a shortest path to the final destination; and providing, via a navigation system, an indication of the favorability of a parking space proximate the vehicle wherein the indication of the favorability of a parking space proximate the vehicle comprises:

an indication of a distance from the vehicle to a pedestrian access point to the parking facility;

an indication of a distance from the pedestrian access point of the final destination, and an indication of a direction of travel within the parking facility for parking spaces with improved favorability of parking space location.

* * * * *